(12) United States Patent
Chen et al.

(10) Patent No.: US 9,120,270 B2
(45) Date of Patent: Sep. 1, 2015

(54) DIGITAL MASK-IMAGE-PROJECTION-BASED ADDITIVE MANUFACTURING THAT APPLIES SHEARING FORCE TO DETACH EACH ADDED LAYER

(71) Applicants: Yong Chen, Burbank, CA (US); Chi Zhou, Riverside, CA (US)

(72) Inventors: Yong Chen, Burbank, CA (US); Chi Zhou, Riverside, CA (US)

(73) Assignee: UNIVERSITY OF SOUTHERN CALIFORNIA, Los Angeles, CA (US)

( * ) Notice: Subject to any disclaimer, the term of this patent is extended or adjusted under 35 U.S.C. 154(b) by 0 days.

(21) Appl. No.: 13/872,954

(22) Filed: Apr. 29, 2013

(65) Prior Publication Data

US 2013/0295212 A1    Nov. 7, 2013

Related U.S. Application Data

(60) Provisional application No. 61/639,570, filed on Apr. 27, 2012, provisional application No. 61/650,876, filed on May 23, 2012.

(51) Int. Cl.
*B29C 47/04* (2006.01)
*B29C 67/00* (2006.01)

(52) U.S. Cl.
CPC ............. *B29C 67/0088* (2013.01); *B29C 67/00* (2013.01); *B29C 67/007* (2013.01)

(58) Field of Classification Search
CPC .... B29C 41/00; B23B 23/00; B23B 2260/00; B23B 2262/00
USPC ....................................................... 425/150
See application file for complete search history.

(56) References Cited

U.S. PATENT DOCUMENTS 7,556,490 B2    7/2009   Wicker et al.

OTHER PUBLICATIONS

"Development of a Multi-material Mask-Image-Projection-based Stereolithography for the Fabrication of Digital materials" by Zhou & Chen et al. (presented at Solid Freeform Fabrication Symposium 2011, held Aug. 8-10, 2011 and available at http://utwired.engr.utexas.edu/lff/symposium/proceedingsArchive/pubs/Manuscripts/2011/2011-06-Zhou.pdf).*
Prof. Chi Zhou Curriculum Vitae Jul. 2013.*
Bertsch, A. et al. 2000. Rapid prototyping of small size objects, Rapid Prototyping Journal, vol. 6, No. 4, pp. 259-266.

(Continued)

*Primary Examiner* — Joseph S Del Sole
*Assistant Examiner* — John Robitaille
(74) *Attorney, Agent, or Firm* — McDermott Will & Emery LLP

(57) ABSTRACT

A three-dimensional object may be produced in cascaded layers from a liquid resin that solidifies upon exposure to light. A translation stage may be positioned relative to a vat that is suitable for solidifying the highest un-solidified layer of the three-dimensional object directly beneath any existing, solidified layers of the three-dimensional object. A mask image projection system may project a two-dimensional image of the highest un-solidified layer through a transparent bottom of the vat and into the liquid resin. This may cause at least a portion of the liquid resin to solidify in the shape of the two-dimensional image and to adhere to the bottom of a surface beneath the solidified layer. A shearing force may be applied between the bottom surface of the solidified layer and the surface beneath that is great enough to detach the solidified layer from the surface beneath.

19 Claims, 23 Drawing Sheets

(56) References Cited

OTHER PUBLICATIONS

Chen, Y. et al. 2011. A layerless additive manufacturing process based on CNC accumulation, Rapid Prototyping Journal, vol. 17, No. 3, pp. 218-227.

Choi, J. W. et al. 2010. Multi-material microstereolithography, Int. J. Adv. Manuf. Technol, vol. 49, pp. 543-551.

Choi, J et al. 2011. Multiple-material stereolithography, Journal of Materials Processing Technology, vol. 211/3, pp. 318-328.

Dendukuri, D. et al. 2006. Continuous-flow lithography for high-throughput microparticle synthesis, Nature Mater., vol. 5, pp. 365-369.

Envisiontec. Ultra: The Benchmark in 3-Dimensional Desktop Printing. Technical data sheet [no date] from envisiontec.com.

Han, L. et al. 2008. Projection Microfabrication of three-dimensional scaffolds for tissue engineering, Journal of Manufacturing Science and Engineering, vol. 130, 021005.

Han, L. et al. 2010. Fabrication of three-dimensional scaffolds for heterogeneous tissue engineering, Biomed Microdevices, No. 12, pp. 721-725.

Huang, Y.M. et al. 2005. On-line force monitoring of platform ascending rapid prototyping system, Journal of Materials Processing Technology, vol. 159, pp. 257-264.

Imamdar, A. et al. 2006. Development of an automated multiple material stereolithography machine, In: Proceedings of Annual Solid Freeform Fabrication Symposium, Austin, TX, pp. 624-635.

Kim, H. et al. 2010. Process planning and scheduling for multiple material stereolithography, Rapid Prototyping J. vol. 16, No. 4, pp. 232-240.

Kim, H. et al. 2010. Slice overlap detection algorithm for the process planning of multiple material stereolithography apparatus, Int. J. Adv. Manuf. Technol. vol. 46, No. 9, pp. 1161-1170.

Maruo, S. et al. 2001. Multi-polymer microstereolithography for hybrid opto-MEMS, Proceedings of the 14th IEEE International Conference on Micro Electro Mechanical Systems (MEMS 2001), pp. 151-154.

Sun, C.N. et al. 2005. Projection micro-stereolithography using digital micro-mirror dynamic mask, Sensors and Actuators A. vol. 121, pp. 113-120.

Wicker, R et al. 2005. Multiple-material-microfabrication: extending stereo lithography to tissue engineering and other novel application, In: Proceedings of Annual Solid Freeform fabrication Symposium, Austin, TX, pp. 754-764.

\* cited by examiner

T = 1 sec, Area = 625 mm²

T = 0.5 sec, Area = 625 mm²

CAD model

Built part

Mask A

Mask B

Built part (a) CAD model (b) Built part

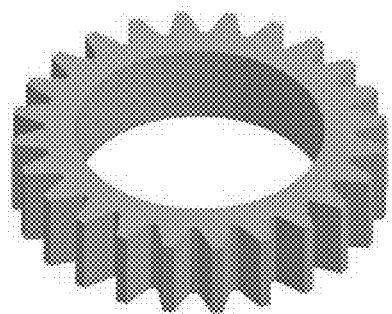
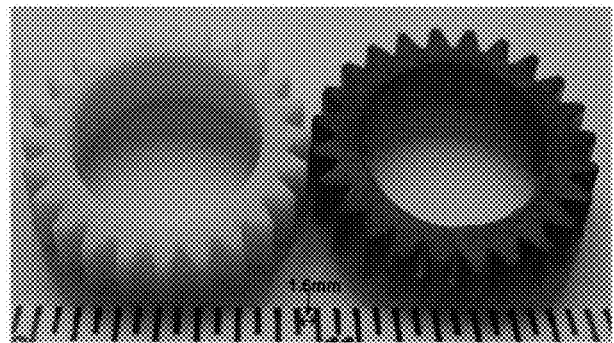
FIG. 24A  FIG. 24B
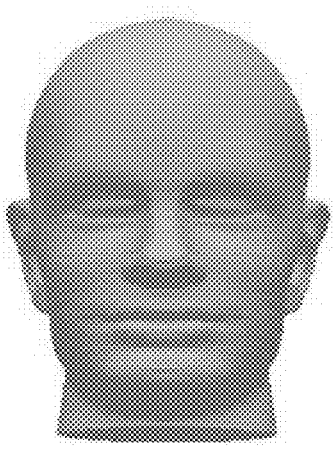
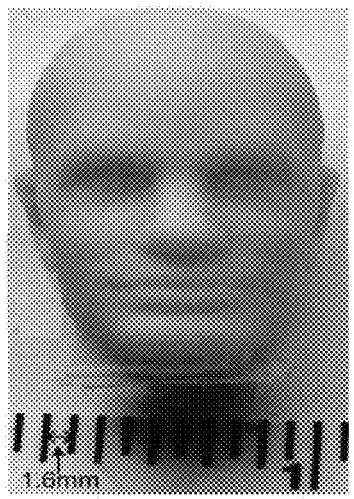
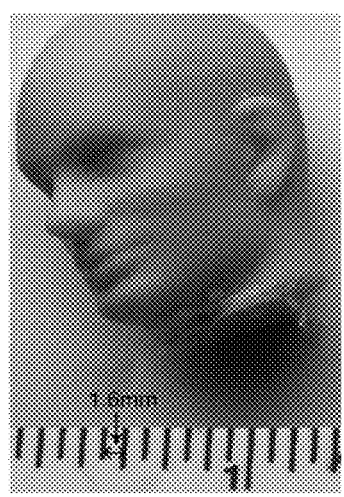
FIG. 25A  FIG. 25B  FIG. 25C

DIGITAL MASK-IMAGE-PROJECTION-BASED ADDITIVE MANUFACTURING THAT APPLIES SHEARING FORCE TO DETACH EACH ADDED LAYER

CROSS-REFERENCE TO RELATED APPLICATIONS

This application is based upon and claims priority to U.S. provisional patent application 61/639,570, entitled "DIGITAL MASK-IMAGE-PROJECTION-BASED ADDITIVE MANUFACTURING FOR THE FABRICATION OF DIGITAL MATERIALS," filed Apr. 27, 2012, and U.S. provisional patent application 61/650,876, entitled "A FAST MASK PROJECTION STEREOLITHOGRAPHY PROCESS FOR BUILDING DIGITAL MODELS IN MINUTES," filed May 23, 2012.

BACKGROUND

1. Technical Field

This disclosure relates to digital mask-image-projection-based additive manufacturing.

2. Description of Related Art

Layer-based additive manufacturing (AM) manufactures solid objects by the sequential delivery of energy and/or material to specified points in space to produce those solid objects. Multiple materials or functionally graded material may be added in a single component during the building process. An example of such multi-material AM systems is the OBJET Connex series of 3D printers. Based on its PolyJet Matrix Technology, these three-dimensional 3D printers may be capable of manufacturing complex internal structures with digital materials. That is, by combining two base materials in specific concentrations and structures, as many as 51 different materials can be created in a single printed part. Hence, product components can have material designs with desired mechanical properties. For example, both soft and hard materials can be embedded in products such as tooth brushes and remote controllers.

Recent 3D printer development has included digital material fabrication in which two base materials are used to define a wide variety of new materials. The OBJET Connex machines jet model materials from designated micro-scale inkjet printing nozzles. Such a process can have inherent limitations on the selection of base materials, since the jetted liquid may need to have certain viscosity and curing temperature properties in order to be jetted.

Besides inkjet printing technology, a fused deposition modeling (FDM) process can be extended for fabricating parts out of multi-materials, since FDM already has separate extrusion nozzles for the build and support materials. Khalil et al., Khalil, S, Nam, J, Sun, W (2005), *Multi-nozzle deposition for construction of 3D biopolymer tissue scaffolds*, Rapid Prototyping Journal, Vol. 11 (1), pp. 9-17 presented a multi-nozzle deposition system for producing 3D tissue-engineered scaffolds. However, the FDM process may have limitations on its minimum nozzle size and may be relatively slow. Hence, FDM may not be suitable for digital material fabrication.

There have been attempts at using selective laser sintering (SLS) for multi-material fabrication. See Jackson, B, Wood, K, Beaman, J J (2000), *Discrete multi-material selective laser sintering: development for an application in complex sand casting core arrays*, In: Proceedings of Solid Freeform Fabrication Symposium, The University of Texas at Austin, Austin, Tex., pp. 176-182; Liew, C L, Leong, K F, Chua, C K, Du, Z (2001), *Dual material rapid prototyping tech-niques for the development of biomedical devices, Part I, Space creation*, Int. J. Adv. Manuf. Technol., Vol. 18 (10), pp. 717-723; Liew, C L, Leong, K F, Chua, C. K, Du, Z (2002), *Dual material rapid prototyping techniques for the development of biomedical devices, Part II, Secondary powder deposition*, Int. J. Adv. Manuf. Technol. Vol. 19 (9), pp. 679-687; Santosa, J, Jing, D, Das, S (2002), *Experimental and numerical study on the flow of fine powders from small-scale hoppers applied to SLS multi-material deposition*, In: Proceedings of Solid Freeform Fabrication Symposium, The University of Texas at Austin, Austin, Tex., pp. 620-627; Regenfuss, P, Streek, A, Hartwig, L, Klötzer, S, Brabant, Th, Horn, M, Ebert, R, Exner, H (2007), *Principles of laser micro sintering*, Rapid Prototyping Journal. Vol. 13 (4), pp. 204-212. However, accurate material feeding and recoating may be required by the digital material fabrication, but may be difficult to integrate into an SLS process.

Another AM process is Stereolithography Apparatus (SLA). By using a laser and liquid photocurable resin, SLA may provide a high quality surface finish, dimensional accuracy, and a variety of material options. To address its speed limitation, a mask-image-projection-based Stereolithography (MIP-SL) process may be considered instead. An illustration of an example MIP-SL process and results that it can achieve are shown in FIGS. 1A and 1B. Instead of the laser used in SLA, a Digital Micromirror Device (DMD) may be used in the MIP-SL process to dynamically define mask images to be projected on a resin surface area. A DMD is a micro-electromechanical system (MEMS) device that enables one to simultaneously control a large number of small mirrors (e.g., about 1 million) to turn on or off a pixel each at over 5 KHz. In the MIP-SL process, a three-dimensional (3D) CAD model of an object may first be sliced by a set of stacked, horizontal planes. Each thin slice may then be converted into a two-dimensional (2D) mask image. The planned mask image may then be sent to the DMD. Accordingly, the image may be projected onto a resin surface, such that liquid photo curable resin can be selectively cured to form a layer of the object. By repeating the process, 3D objects can be formed on a layer-by-layer basis. Compared to the laser-based SLA, the MIP-SL process can be much faster due to its capability to simultaneously form the shape of a whole layer. Two test parts built by a prototype MIP-SL system using two different materials are also shown in the FIG. 1.

Principles of a Mask-Image-Projection-Based SL System Multi-Material Fabrication Limitation Multiple vats may be required for different types of liquid resin in the multi-material SLA and MIP-SL processes. As a natural extension to the single material SLA system, Maruo, S, Ikuta, K, and Ninagawa, T (2001), *Multi-polymer microstereolithography for hybrid opto-MEMS*, Proceedings of the 14$^{th}$ IEEE International Conference on Micro Electro Mechanical Systems (MEMS 2001), pp. 151-154, presented a multiple material stereo lithography system by manually removing the vat from the platform and draining the current material, rinsing the vat, returning the vat to the platform, and dispensing a prescribed volume of a different material into the vat. However, based on the lengthy process of manually changing the materials, the system may be limited to simple 2.5D microstructures. Wicker, R, Medina, F, and Elkins, C (2005), *Multiplematerialmicro-fabrication: extending stereo lithography to tissue engineering and other novel application*, In: Proceedings of Annual Solid Freeform fabrication Symposium, Austin, Tex., pp. 754-764; Choi, J, Kim, E H, and Wicker, R (2011), *Multiple-material stereolithography*, Journal of Materials Processing Technology, Vol. 211/3, pp. 318-328; Wicker, R, Medina, F, and Elkins, C, (2009), *Multi-material stereolithography*, U.S. Pat. No. 7,556,490, extended the work by developing a multiple vat carousel system to automate the building process including washing, curing and drying cycle between build materials. Based on similar ideas, Choi, J W, MacDonald, E, Wicker, R (2010), *Multi-material microstereolithography*, Int. J. Adv. Manuf. Technol. Vol. 49, pp. 543-551, reported a multi-material MIP-SL system for fabricating micro-scale objects. Arcaute, K, Zuverza, N, Mann, B, and Wicker, R (2006), *Development of an automated multiple material stereolithography machine*, In: Proceedings of Annual Solid Freeform Fabrication Symposium, Austin, Tex., pp. 624-635; Han, L, Suri, S, Schmidt, C E, and Chen, S (2010), *Fabrication of three-dimensional scaffolds for heterogeneous tissue engineering*, Biomed Microdevices, No. 12, 721-725, also presented an automatic material switching approach by dispensing the solution using a pipette into a custom-made small vat, and subsequently washing the current solution before changing to the next solution. Based on the technique, fabricated 3D scaffolds for heterogeneous tissue engineering have been demonstrated.

A challenge in the use of multiple materials in SL may be how to manage material contamination between changing different materials used in the fabrication process. The previous research of Maruo, S, Ikuta, K, and Ninagawa, T (2001), *Multi-polymer microstereolithography for hybrid opto-MEMS*, Proceedings of the 14th IEEE International Conference on Micro Electro Mechanical Systems (MEMS 2001), pp. 151-154; Wicker, R, Medina, F, and Elkins, C (2005), *Multiple material micro-fabrication: extending stereo lithography to tissue engineering and other novel application*, In: Proceedings of Annual Solid Freeform fabrication Symposium, Austin, Tex., pp. 754-764; Choi, J, Kim, E H, and Wicker, R (2011), *Multiple-material stereolithography*, Journal of Materials Processing Technology, Vol. 211/3, pp. 318-328; Wicker, R., Medina F, and Elkins, C (2009), *Multi-material stereolithography*, U.S. Pat. No. 7,556,490; Choi, J W, MacDonald, E, Wicker, R (2010), *Multi-material microstereolithography*, Int. J. Adv. Manuf. Technol, Vol. 49, pp. 543-551; Arcaute, K, Zuverza, N, Mann, B, and Wicker, R (2006), *Development of an automated multiple material stereolithography machine*, In: Proceedings of Annual Solid Freeform Fabrication Symposium, Austin, Tex., pp. 624-635; Han, L, Suri, S, Schmidt, C E, and Chen, S (2010), *Fabrication of three-dimensional scaffolds for heterogeneous tissue engineering*, Biomed Microdevices, No. 12, 721-725, on developing multi-material SLA and MIP-SL systems are all based on top-down projection. As shown in FIG. 2, to accommodate part size in the Z direction, a large tank may have to be maintained for keeping the resin level. Due to the deep vat, draining and cleaning the current resin before changing to another resin vat may take a long time and may lead to significant material waste. To address the problem, Kim, H, Choi, J, and Wicker, R (2010), *Process planning and scheduling for multiple material stereolithography*, Rapid Prototyping J. Vol. 16, No. 4, pp. 232-240; Kim, H, Choi, J, MacDonald, E, and Wicker, R (2010), *Slice overlap detection algorithm for the process planning of multiple material stereolithography apparatus*, Int. J. Adv. Manuf. Technol. Vol. 46, No. 9, pp. 1161-1170, presented a process planning approach to minimize the material changeover number for a given multi-material CAD model. That is, if different materials are separated in a CAD model, one material can be built fully, or as much as possible, before transferring to another material. Even though the approach may be able to reduce the material changeover efforts, it may not be a general approach, especially for digital material fabrication in which different materials may be interlocked with each other.

Speed Limitation of Single-Material Fabrication

In the MIP-SL process, the building time of each layer may consist of spreading liquid resin into a uniform thin layer and curing the formed liquid layer into a solid layer. Compared to a laser beam that is used in the SLA process, the DMD used in the MIP-SLA process can dramatically decrease the curing time of a layer. Hence, the bottleneck for achieving a fast building speed may be the spreading of liquid resin into uniform thin layers.

Research systems Chatwin C, M Farsari, S Huang, M Heywood, P Birch, R Young, J Richardson (1998), *UV microstereolithography system that uses spatial light modulator technology*, Applied Optics, Vol. 37, pp. 7514-22; Bertsch, A, P Bernhard, C Vogt, P Renaud (2000), *Rapid prototyping of small size objects*, Rapid Prototyping Journal, Vol. 6, Number 4, pp. 259-266; Stampfl, J, H Fouad, S Seidler, R Liska, F Schwager, A Woesz, P Fratzl (2004), *Fabrication and moulding of cellular materials by rapid prototyping*, Int. J. Materials and Product Technology, Vol. 21, No. 4, pp 285-296; Sun C, N Fang, D Wu, X Zhang, (2005), *Projection micro-stereolithography using digital micro-mirror dynamic mask*, Sensors and Actuators A. Vol. 121, pp. 113-120; Lu, Y, G Mapili, G Suhali, S C Chen, K Roy, (2006), *A digital micro-mirror device (DMD)-based system for the micro fabrication of complex, spatially patterned tissue engineering scaffolds*, Journal of Biomedical Materials Research A, Vol. 77A (2), pp. 396-405; Limaye, A, D W Rosen, (2007), *Process planning method for mask projection micro-stereolithography*, Rapid Prototyping Journal, Vol. 13, No. 2, pp. 76-84; Choi, J, R B Wicker, S Cho, C Ha, and S Lee, (2009), *Cure depth control for complex 3D microstructure fabrication in dynamic mask projection microstereolithography*, Rapid Prototyping Journal, Vol. 15 (1), pp. 59-70 and commercial systems, such as EnvisionTEC and V-Flash desktop modeler, have been developed based on the mask image projection approach. Most of the developed systems are based on the top-down projection as shown in FIG. 1. Suppose $d_{LT}$ is the layer thickness. After a previous layer has been cured, the platform in such a system usually moves down a certain distance d and then up by $d-d_{LT}$ in order to spread liquid resin into a uniform thin layer. In addition to the Z movement, a recoating process may be required to sweep through the platform such that the top surface can be flattened. For resin with low viscosity, a deep-dip recoating approach has also been developed to replace the surface sweeping approach. After the up and down movements in the Z axis, a sufficient waiting time may be required for the liquid resin to settle down into a flat surface. However, such recoating methods may take over a minute, which may limit the building speed of the MIP-SL process. Consequently, the building time of such MIP-SL systems may still be measured in hours.

Part Separation of Traditional Bottom-Up Projection Based MIP-SL Process

In the bottom-up projection based MIP-SL process, a cured layer may be sandwiched between the previous layer and the resin vat. The solidified material may adhere strongly to the corresponding rigid or semi-rigid transparent solidification substrate, causing the object to break or deform when the build platform and vat are pulled apart during the building process.

One approach to conquer the attachment force may be to increase the exposure to significantly over-cure the current layer such that its bonding force with the previous layer can be increased. However, over-curing can lead to poor surface quality and inaccurate dimensions. Another approach to address the problem may be to apply a certain coating on the resin vat such that the attachment force can be reduced. Suitable coatings, including Teflon and silicone films, can help the separation of the part from the vat. See Chen. Y, Zhou, C, and Lao, J (2011), *A layerless additive manufacturing process based on CNC accumulation*, Rapid Prototyping Journal, Vol. 17, No. 3, pp. 218-227; Huang, Y M, Jiang, C P (2005), *On-line force monitoring of platform ascending rapid prototyping system*, Journal of Materials Processing Technology, Vol. 159 pp. 257-64. A coated Teflon glass has also been used in the machines of Denken, *SLP-4000 Solid Laser Diode Plotter*, Product Brochure, Denken Corporation, Japan, 1997; and the EnvisionTEC ULTRA.

Even with an intermediate material, the separation force can still be relatively large. Huang, Y M, Jiang, C P (2005), *On-line force monitoring of platform ascending rapid prototyping system*, Journal of Materials Processing Technology, Vol. 159 pp. 257-64, investigated the attachment force for the coating of an elastic silicone film. Based on a developed on-line force monitoring system, test results indicate that the pulling force increases linearly with the size of the working area. Experiments indicate that, for a square of 60×60 mm, the pulling force to separate the part from the film can be greater than 60 N. Such a large attachment force between the cured layer and the vat can be a key challenge in the development of the bottom-up projection based MIP-SL system.

Another type of coating material, Polydimethylsiloxane (PDMS, Sylgard 184, Dow Corning), may be applied on the resin vat. This selection is based on a property of the PDMS film during the polymerization process that was identified in Dendukuri, D, Pregibon, D C, Collins, J, Hatton, T A, and Doyle, P S (2006), *Continuous-flow lithography for high-throughput microparticle synthesis*, Nature Mater., Vol. 5, pp. 365-369, who presented a photolithography-based microfluidic technique for continuously fabricating polymeric particles. The developed technique is based on the oxygen-aided inhibition near the PDMS surfaces to form chain-terminating peroxide radicals. In the process, a very thin oxygen inhibition layer (~2.5 µm) is formed that can prevent the cured layer from attaching to the PDMS film.

Separation Forces for Solidified Resin Based on the PDMS Film

A set of physical experiments have been performed to investigate the separation force of a cured layer based on a coated PDMS glass. The setup for measuring the pulling force is shown in FIG. 4A. Two Flexi Force sensors (Tekscan, South Boston, Mass.) with a range of 0-25 lbs are sandwiched between the fixture and vat. Since the vat is free at the bottom and the side, and only fixed at the top, the pulling force by the part will be transferred to the sensors when the platform rises. The two sensors are connected to a microcontroller, which can sample and record the sensors' readouts at over 3 KHz. In the experiments, a given mask image was used to build a certain number of layers (e.g. 25 layers). The separation force in the building process of the next few layers was then recorded. For each layer, after the designed mask image has been exposed for a certain time, the platform is raised up slowly at 0.6 mm/sec and the related readouts of the two sensors are then recorded.

Three factors potentially affecting the separation force include: (1) exposure time; (2) image area; and (3) image shape. To understand the effects of these factors, designed experiments were conducted. FIG. 4B shows a set of mask images that have been used in the experiments for testing the effect of image shapes. The tested projection patterns, including triangle, square, hexagon, circle, t-shape, u-shape, band, and star-shape, have the same area in each test. FIG. 5 shows the measured separation forces of a sensor for different test cases. The horizontal axis indicates the distance in the Z direction (in the unit of 10 µm), and the vertical axis indicates the recorded pulling force (in ounces).

Based on the experimental results, it can be observed that:

(1) As the Z stage moves up, the separation force increases until it reaches a peak value when the cured layer is detached from the PDMS film;

(2) The peak force gets larger when the same mask image is exposed longer;

(3) The peak force gets larger when a larger image area is projected;

(4) The image shape has more complex effects on the peak force. In addition, their effects may interact with the exposure time and the projection area;

(5) With the coated PDMS film on the vat, the separation force may still be considerably large (~100 oz or 27.8 N for an image area of 625 mm$^2$ with 1 second exposure).

Separation Force for Liquid Resin without Curing

A similar set of experiments was conducted to analyze the pulling force of a part without liquid resin being cured between the part and the vat. In the experiments, an image of a square (35 mm×35 mm) was used to build a certain number of layers (e.g. 25 layers). The built part was then lowered to form a certain gap with the PDMS film. Without exposing any image to cure liquid resin, the platform was then raised up slowly at 1.2 mm/sec and the related separation forces were recorded on the force sensors. Different gap sizes (0.1-0.5 mm) were tested. The experiment result is shown in FIG. 6. It can be seen that:

(1) The separation force is smaller than the related cases with solidified resin;

(2) The separation force decreases with a larger gap size between the part and the PDMS film;

(3) The separation force can only be neglected until the gap size is larger than 0.5 mm.

The experiment results indicate that the suction force between the cured layer and the PDMS film may be large during the pulling-up process. Such a large force on the cured layer may cause the building process to fail if the bonding force between the current layer and previous layers is smaller than the suction force. In addition, after building multiple layers, such forces on the PDMS film may lead to produce cracks in the film due to material fatigue caused by the cyclic loading.

SUMMARY

A three-dimensional object may be produced in cascaded layers from a liquid resin that solidifies upon exposure to light. A vat may hold the liquid resin. The vat may include a transparent bottom that allows light to pass through the transparent bottom portion and into the liquid resin. A mask image projection system may project a controllable two-dimensional image through the bottom of the vat and into the liquid resin that causes at least a portion of the liquid resin to solidify in the shape of the two-dimensional image. There may also be a translation stage. A process controller may cause the translation stage to be in a position relative to the vat that is suitable for solidifying the highest layer of the three-dimensional object that has not yet been solidified directly beneath any existing layers of the three-dimensional object that have been solidified. The process controller may cause the mask image projection system to project a two-dimensional image of the highest un-solidified layer of the three-dimensional object through the bottom of the vat and into the liquid resin. This may cause at least a portion of the liquid resin to solidify in the shape of the two-dimensional image and to adhere to the bottom of a surface beneath the solidified layer and to the bottom of the last layer that was previously solidified or, if none, to the bottom of the translation stage. The process controller may apply a shearing force between the bottom surface of the solidified layer and the surface beneath that is great enough to detach the solidified layer from the surface beneath. The process controller may cause one or more of the foregoing sequence of steps to be repeated until all of the cascaded layers of the three-dimensional object are solidified.

The relative movement between the translation stage and the vat that applies the shearing force may include horizontal, longitudinal movement.

Before one instance of the relative movement, the translation stage may be in a first horizontal position with respect to the vat. After the one instance of the relative movement, the translation stage may be in a second horizontal position with respect to the vat that is substantially different than the horizontal first position. The process controller may, while in both the first and the second horizontal positions, causes the mask image projection system to project a two-dimensional image of the highest un-solidified layer of the three-dimensional object through the bottom of the vat and into the liquid resin, thereby causing at least a portion of the liquid resin to solidify in the shape of the two-dimensional image.

The horizontal location of the image that is projected by the mask image projection system with respect to the horizontal location of the translation stage before the one instance of the relative movement and after the one instance of the relative movement may be the same.

The relative movement between the translation stage and the vat that applies the shearing force may be rotational movement.

The system for producing a three-dimensional object in cascaded layers may include a solid, transparent coating between the top of the transparent bottom vat and the bottom of the liquid resin. The solid, transparent coating may be a PDMS film. The PDMS film may be coated on the top of the transparent bottom of the vat. The solid, transparent coating may have a thickness of between 0.1 and 5 mm, between 0.25 and 3 mm, or between 0.5 and 1.5 mm.

The three-dimensional object may have a maximum horizontal object width along its height. The interior of the vat may have a horizontal vat width that is at least twice the maximum horizontal object width. The transparent coating may have a horizontal coating width that is no more than the horizontal vat width, less the maximum horizontal object width.

The horizontal, longitudinal movement may traverse a length that is at least the maximum horizontal object width.

The translation stage may controllably move to different locations within the vat. The process controller may cause the relative movement between the translation stage and the vat by causing the translation stage to move.

The process controller may be configured to controllable move the translation stage and/or the vat.

A system may produce a three-dimensional object in cascaded layers from a first and a different second liquid resin that each solidify upon exposure to light. A first vat may hold the first liquid resin. The first vat may have a first transparent bottom that allows light to pass through the first transparent bottom and into the first liquid resin. A second vat may be different than the first vat and may hold the second liquid resin. The second vat may have a second transparent bottom that allows light to pass through the second transparent bottom and into the bottom of the second liquid resin. A mask image projection system may project a controllable two-dimensional image through the transparent bottom of the first vat and into the first liquid resin that causes at least a portion of the first liquid resin to solidify in the shape of the two-dimensional image. At a different time, the mask image projection system may project a controllable two-dimensional image through the transparent bottom of the second vat and into the second liquid resin that causes at least a portion of the second liquid resin to solidify in the shape of the two-dimensional image. A process controller may causes the translation stage to be in a position relative to the first vat that is suitable for solidifying the highest un-solidified layer of the three-dimensional object that has not yet been solidified directly beneath any existing layers of the three-dimensional object that have been solidified. The process controller may cause the mask image projection system to project a two-dimensional image of an un-solidified layer of the three-dimensional object through the transparent bottom of the first vat and onto the first liquid resin, thereby causing at least a portion of the first liquid resin to solidify in the shape of the two-dimensional image and to adhere to the bottom of a surface beneath the solidified layer and to the bottom of the last layer that was previously solidified or, if none, to the bottom of the translation stage. The process controller may apply a shearing force between the bottom surface of the solidified layer and the surface beneath that is great enough to detach the first solidified layer from the surface beneath it. The process controller may cause the translation stage to be in a position relative to the second vat that is suitable for solidifying the highest un-solidified layer of the three-dimensional object that has not yet been solidified directly beneath any existing layers of the three-dimensional object that have been solidified. The process controller may cause the mask image projection system to project another two-dimensional image of the highest un-solidified layer of the three-dimensional object through the transparent bottom of the second vat and into the second liquid resin, thereby causing at least a portion of the second liquid resin to solidify in the shape of the other two-dimensional image and to adhere to the bottom of a surface beneath the solidified layer and to the bottom of the last layer that was previously solidified or, if none, to the bottom of the translation stage. The process controller may cause the foregoing sequence of steps to be repeated in connection with the first and/or second vat until all of the cascaded layers of the three-dimensional object are solidified.

The system may include a rotating table containing the first and the second vats and that, during the sequence of steps, rotates them under the control of the process controller relative to the translation stage and the mask imaging system.

The system may include a first and a second brush on the rotating table. The process controller may cause the bottom of any cascaded layers to be brushed by the first brush but not the second brush before causing the translation stage to be in the position relative to the first vat. The process controller may cause the bottom of any cascaded layers to be brushed by the second brush but not the first brush before causing the translation stage to be in the position relative to the second vat.

These, as well as other components, steps, features, objects, benefits, and advantages, will now become clear from a review of the following detailed description of illustrative embodiments, the accompanying drawings, and the claims.

BRIEF DESCRIPTION OF DRAWINGS

The drawings are of illustrative embodiments. They do not illustrate all embodiments. Other embodiments may be used in addition or instead. Details that may be apparent or unnecessary may be omitted to save space or for more effective illustration. Some embodiments may be practiced with additional components or steps and/or without all of the components or steps that are illustrated. When the same numeral appears in different drawings, it refers to the same or like components or steps.

FIG. 4A illustrates an example of a one channel system with PDMS film; FIG. 4B illustrates an example of different protection patters with the same area.

FIG. 13A illustrates when T=1 sec and area=625 mm$^2$; FIG. 13B illustrates when T=1 and area=156 mm$^2$.

FIGS. 24A and 24B illustrate an example of a test gear. FIG. 24A is a CAD model; FIG. 24B are examples of built objects in two liquid resins.

FIGS. 25A-25C illustrate an example of a test head. FIG. 25A is a CAD model; FIGS. 25B-25C are two views of an example built object.

FIG. 26A is a CAD model; FIGS. 26B-26E are two views of example built objects in two liquid resins.

FIG. 26A is a CAD model; FIGS. 26B-26C are examples of built objects in two liquid resins.

FIG. 28A is a CAD model; FIGS. 28B-28C are two views of an example built object.

FIG. 29A illustrates a CAD model; FIG. 29B illustrates an example built object.

DETAILED DESCRIPTION OF ILLUSTRATIVE EMBODIMENTS

Illustrative embodiments are now described. Other embodiments may be used in addition or instead. Details that may be apparent or unnecessary may be omitted to save space or for a more effective presentation. Some embodiments may be practiced with additional components or steps and/or without all of the components or steps that are described.

Figure 1A:
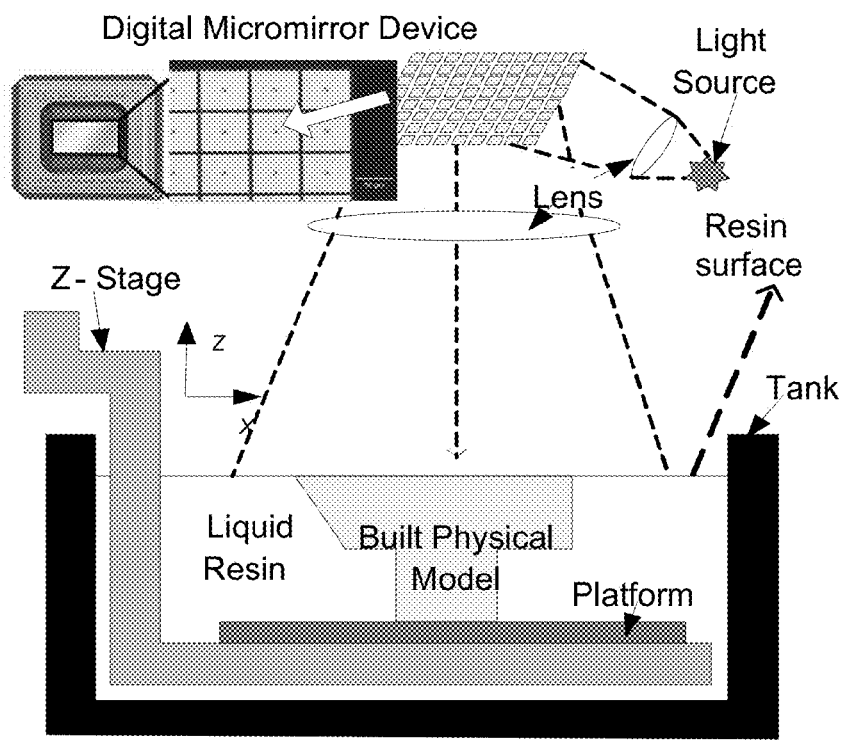
FIG. 1A illustrates an example of an MIP-SL system.
Figure 1B:
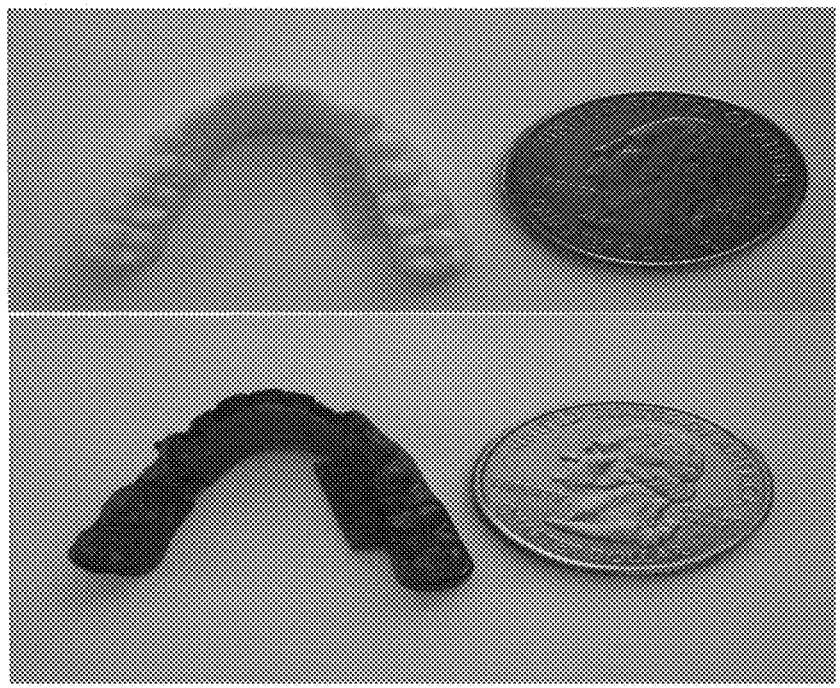
FIG. 1B illustrates examples of results that it may achieve.
Figure 2:
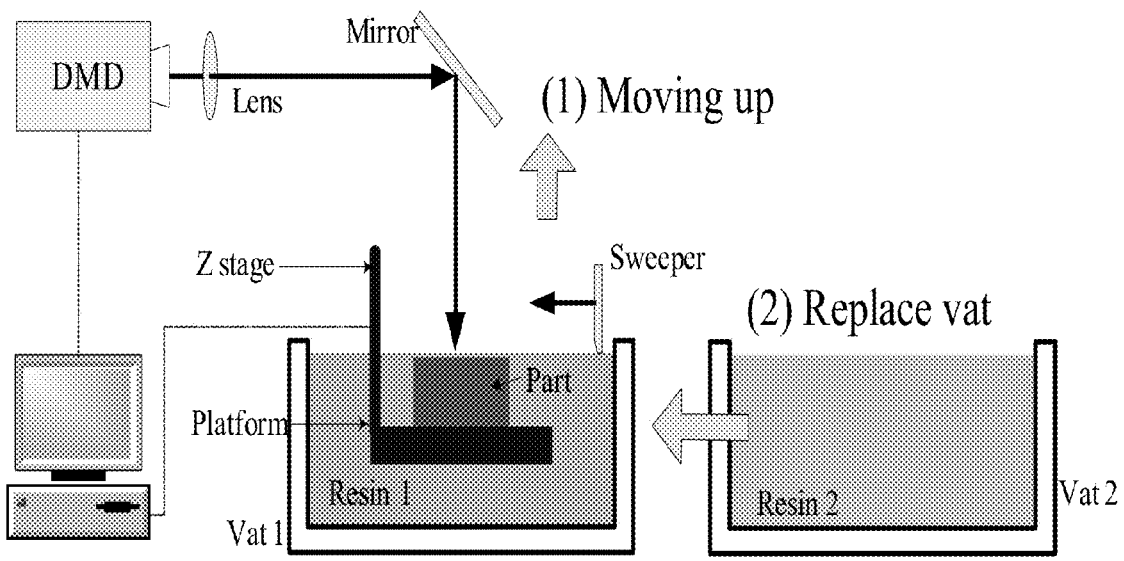
FIG. 2 illustrates an example of a multi-material SL process based on top-down projection.
Figure 3:
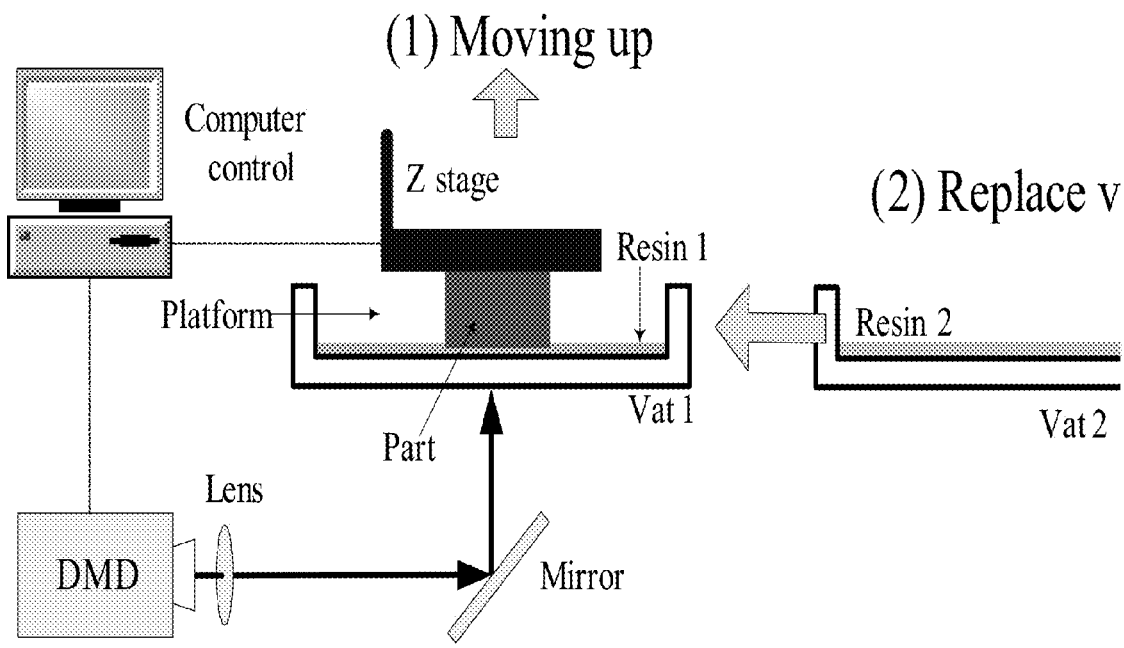
FIG. 3 illustrates an example of a multi-material SL process based on bottom-up projection.

Shearing-Based Recoating Method for the Bottom-Up Projection Based MIP-SL Process Two-Channel Design for Effective Multi-Material Fabrication Building functional microstructures, especially digital material fabrication, may require the development of a general MIP-SL process that can fabricate all combinations of multiple resins. A challenge that may be addressed in such a multi-material MIP-SL system may be reduction of material waste and increase in cleaning efficiency during the resin tank switching process. To address the problem, the bottom-up projection in the multi-material MIP-SL process has been investigated. An illustration of such a system is shown in FIG. 3. The light source may be projected from the bottom of the transparent vat. Since the current built layer is formed at the bottom of the platform, the container depth may be independent of the part height. Thus, the liquid in the vats can potentially be as shallow as a layer thickness, or it can be higher in height. When switching resin tanks, only the portion of the built model that contacts the liquid resin may need to be cleaned. Thus the material changeover efforts can be significantly reduced with less material waste.

To facilitate the bottom-up projection based MIP-SL process, a two-channel design has been developed. This can address the large separation force in the building process.

Two-Way Movement Design for Fast Single-Material Fabrication

A two-channel design was presented for the multi-material MIP-SL process. However, such an approach, mainly designed for switching tanks, may not be suitable for a fast building process. In the two-channel design, the building of each layer may require a full cyclic motion including both moving the platform up and down in the Z axis, and moving the tank back and forth in the X axis. Such motions may slow down the building process. To facilitate a high-speed MIP-SL process based on the bottom-up projection, a two-way movement design was developed that requires less motions than the two-channel design.

By optimizing the process settings, the preparation of a uniform thin layer can be done within seconds. Consequently, the developed fast MIP-SL process can build moderate sized parts in minutes instead of hours.

Two-Channel Design for Bottom-Up Projection Based MIP-SL Process

Figure 7:
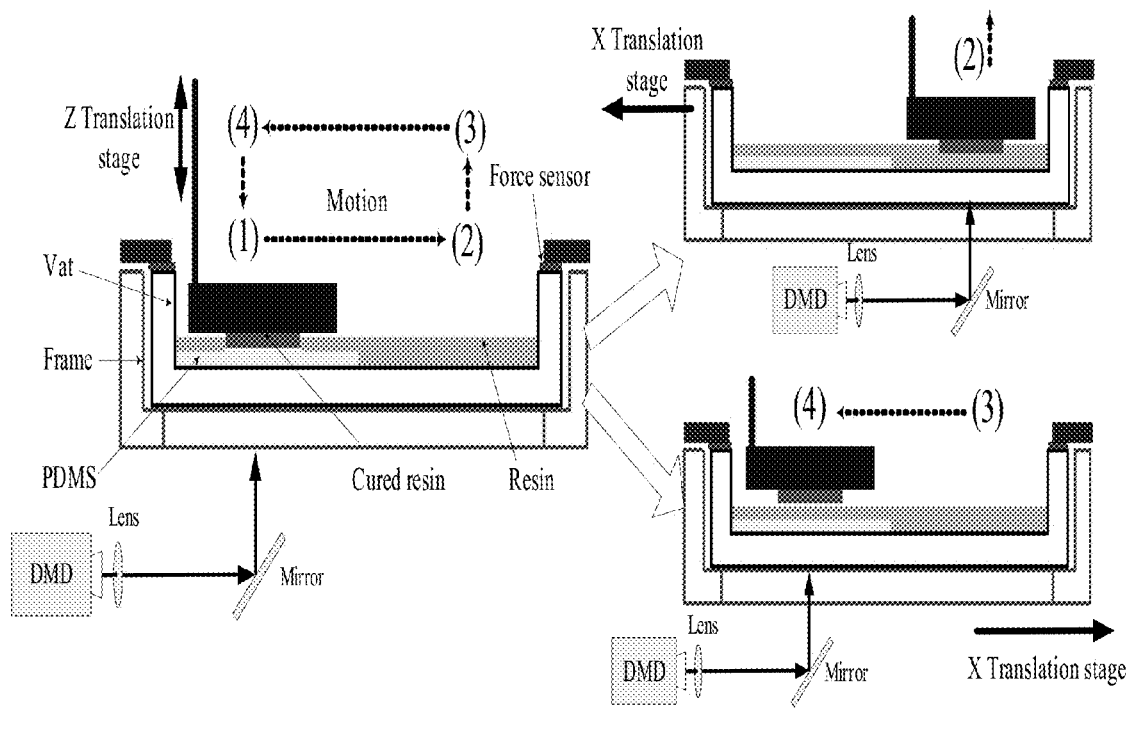
FIG. 7 illustrates an example of a two-channel system with PDMS.
Figure 7:
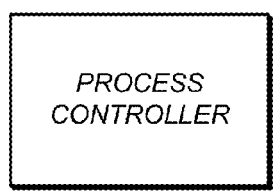
Figure 8A:
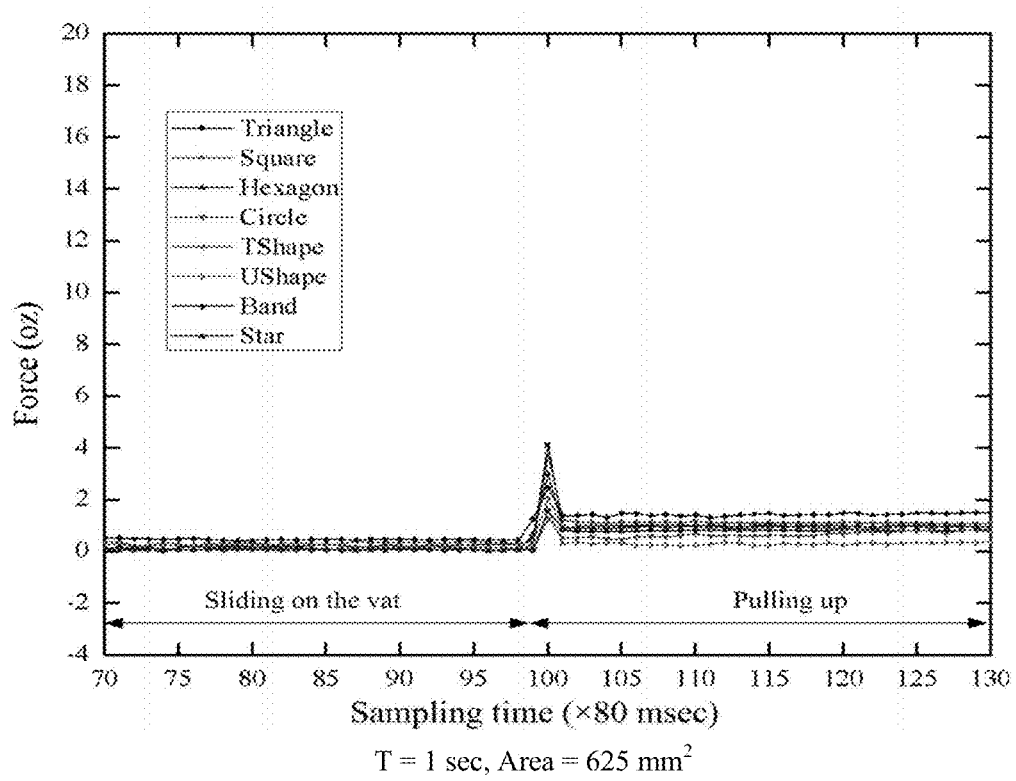
FIG. 8A-8D illustrate examples of pulling forces of cured layer for a two-channel system in different test cases.
Figure 8B:
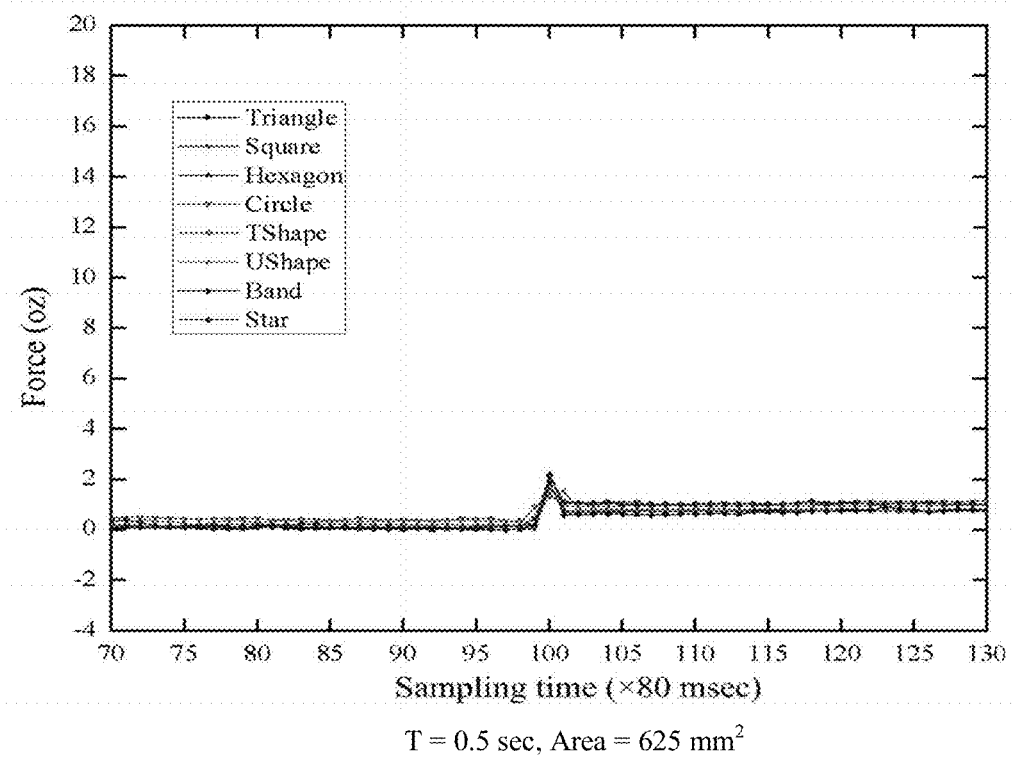
Figure 8C:
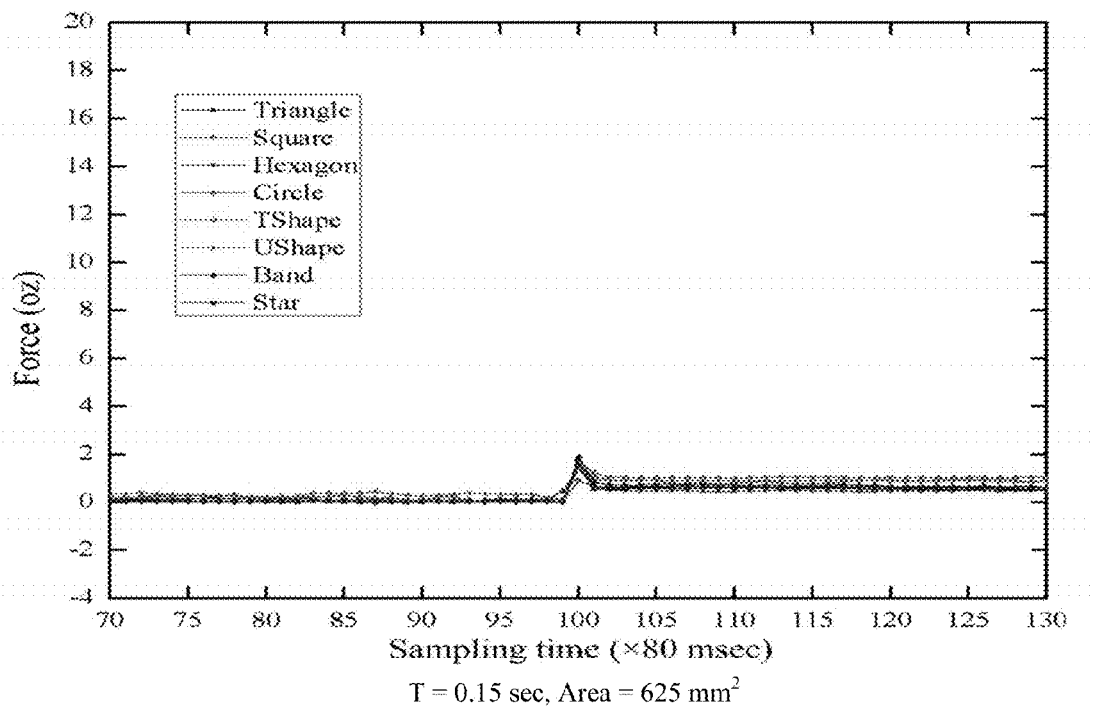
Figure 8D:
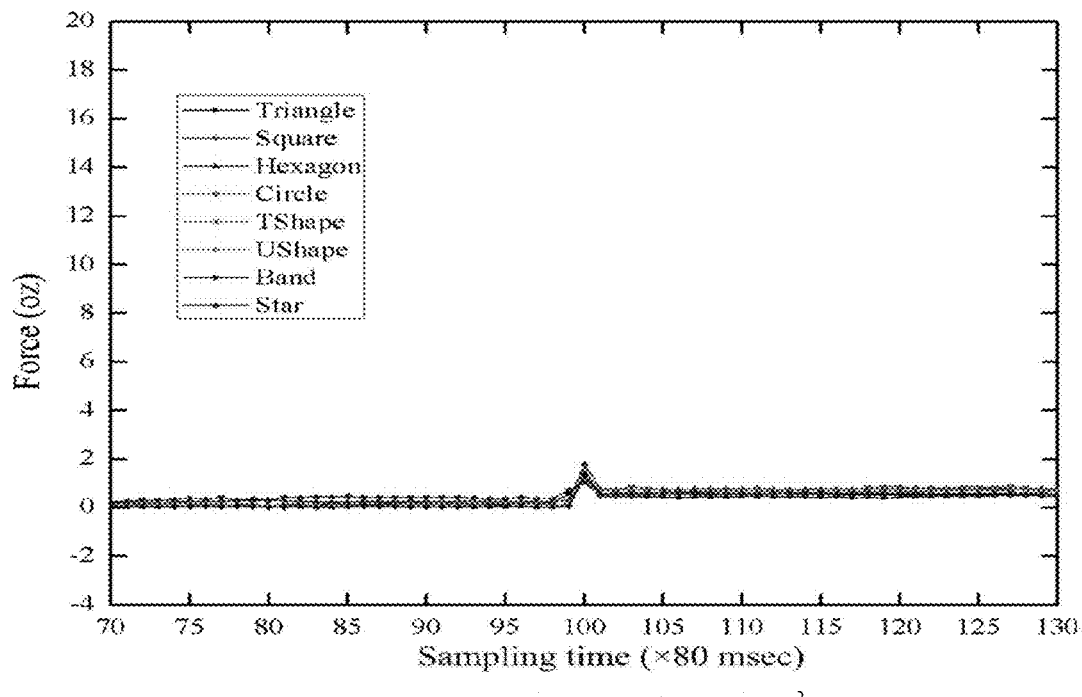

FIG. 7 shows an illustration of a two-channel system design. A transparent PDMS film may be applied on half of the bottom surface of a transparent glass vat. Hence the resin vat may be divided into two channels, one with and one without the PDMS film. A mask image may be exposed only on the channel with PDMS. As shown in FIG. 7, after a layer is cured at Position (1), the vat may be moved along the X axis such that the part is moved to the channel without PDMS (i.e. Position 2). Hence, the large suction force between the cured layer and the PDMS film may be avoided. If the PDMS film is thick enough (e.g. >0.5 mm), the part may be easily separated from the vat. After moving the part up by a certain distance d (position 3), the vat may be moved back such that the part is on top of the channel with PDMS (position 4). Finally, the platform may move down by a distance (d-layer_thickness) for building a new layer. The motion in the X direction may be by the vat and the related frame. Hence, the accuracy of the MIP-SL system may not be affected by the X translation since there is no relative motion between the platform and the projection device.

As illustrated in FIG. 7, the two-channel system (as well as the other systems discussed herein) may include a process controller. The process controller may have a configuration that controls, commands, and synchronizes all of the image projections, movements, position changes, and other actions of the translation stages, vats, rotating stages, and mask image projection systems that are discussed herein, all in accordance with all synchronizations, timings, and/or other criteria of the two-channel (and other) system(s) that are discussed herein. For example, the process controller may generate and deliver the sequence of images that are projected by the mask image projection system and may effectuate the movements of the translation stages, vats, rotating stages, and mask image projection systems discussed herein.

The process controller may include a computer system that is configured to provide the controls, commands, movements, and synchronization described herein. The computer system may include one or more processors, tangible memories (e.g., random access memories (RAMs), read-only memories (ROMs), and/or programmable read only memories (PROMS)), tangible storage devices (e.g., hard disk drives, CD/DVD drives, and/or flash memories), system buses, video processing components, network communication components, input/output ports, and/or user interface devices (e.g., keyboards, pointing devices, displays, microphones, sound reproduction systems, and/or touch screens).

The computer system may include one or more computers at the same or different locations. When at different locations, the computers may be configured to communicate with one another through a wired and/or wireless network communication system.

The computer system may include software (e.g., one or more operating systems, device drivers, application programs, and/or communication programs). When software is included, the software includes programming instructions and may include associated data and libraries. When included, the programming instructions are configured to implement one or more algorithms that implement one or more of the functions of the computer system, as recited herein. The description of each function that is performed by each computer system also constitutes a description of the algorithm(s) that performs that function. The software may be stored on or in one or more non-transitory, tangible storage devices, such as one or more hard disk drives, CDs, DVDs, and/or flash memories. The software may be in source code and/or object code format. Associated data may be stored in any type of volatile and/or non-volatile memory. The software may be loaded into a non-transitory memory and executed by one or more processors.

An appropriate thickness of the coated PDMS film may be based on one or more of the following factors:

(1) The thickness of the oxygen inhibition layer (around 2.5 μm) on the PDMS surface may be independent of the thickness of the PDMS film Dendukuri, D, Pregibon, D C, Collins, J, Hatton, T A, and Doyle, P S (2006), *Continuous-flow lithography for high-throughput microparticle synthesis*, Nature Mater., Vol. 5, pp. 365-369. Thus the exerted force in the X direction may not be directly related to the PDMS film thickness.

(2) More light energy may be taken away by the film if the PDMS film is thicker.

(3) The PDMS film may be thick enough such that the gap between the cured layer and the vat surface at Position (2) will be large enough to have a small separation force.

(4) More resin may have to be maintained for a thicker PDMS film in the channel without PDMS.

Considering all the above factors, the PDMS film thickness may be set at about 1 mm. In other configurations, the thickness may be between 0.1 and 5 mm, 0.25 and 3 mm, or 0.5 and 1.5 mm.

Separation Forces for Solidified Resin

Figure 4A:
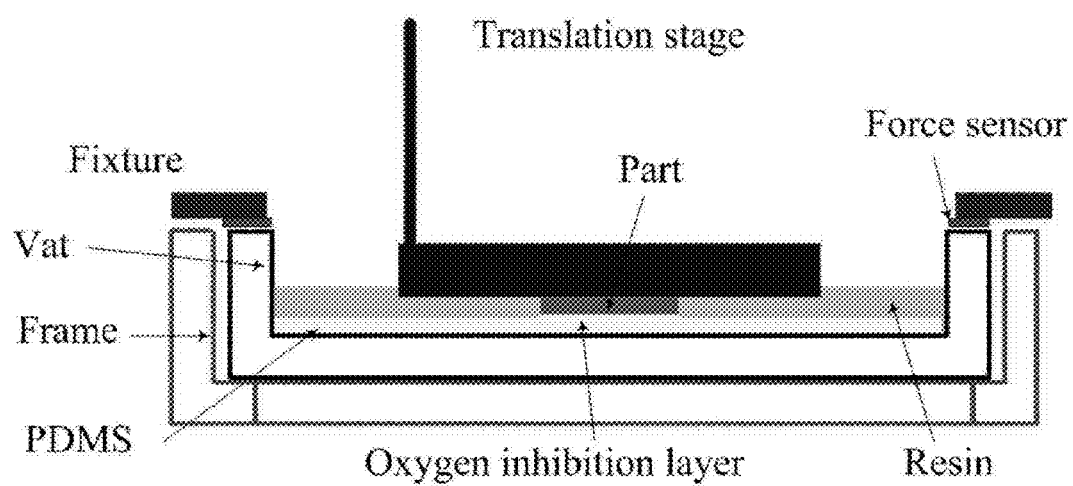
FIG. 4A and FIG. 4B illustrate an experimental setup for studying part separation forces in an MIP-SL process.
Figure 4B:
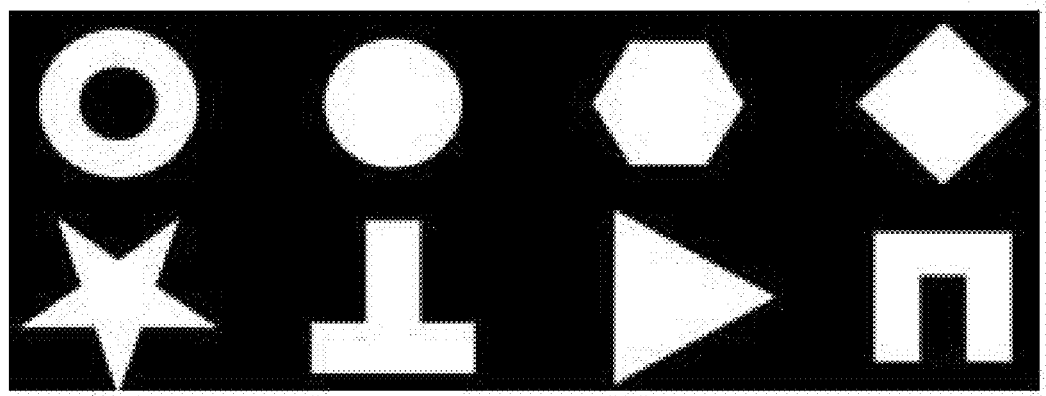
Figure 5A:
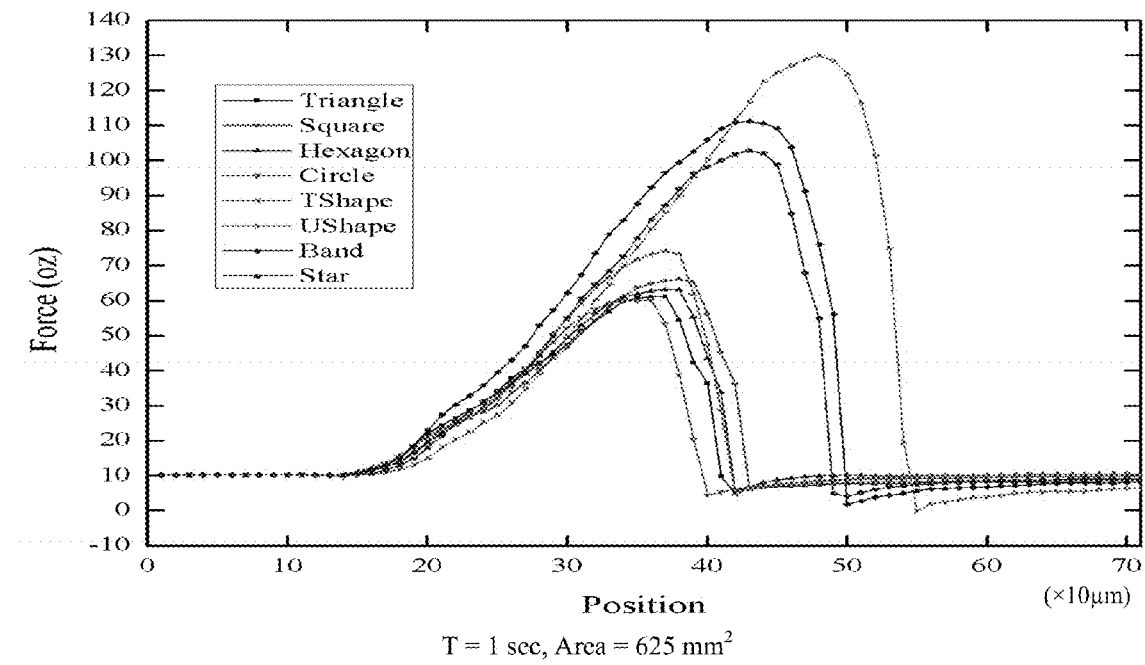
FIG. 5A-5D illustrate an examples of forces when a cured layer is pulled from a PDMS film in different test cases.
Figure 5B:
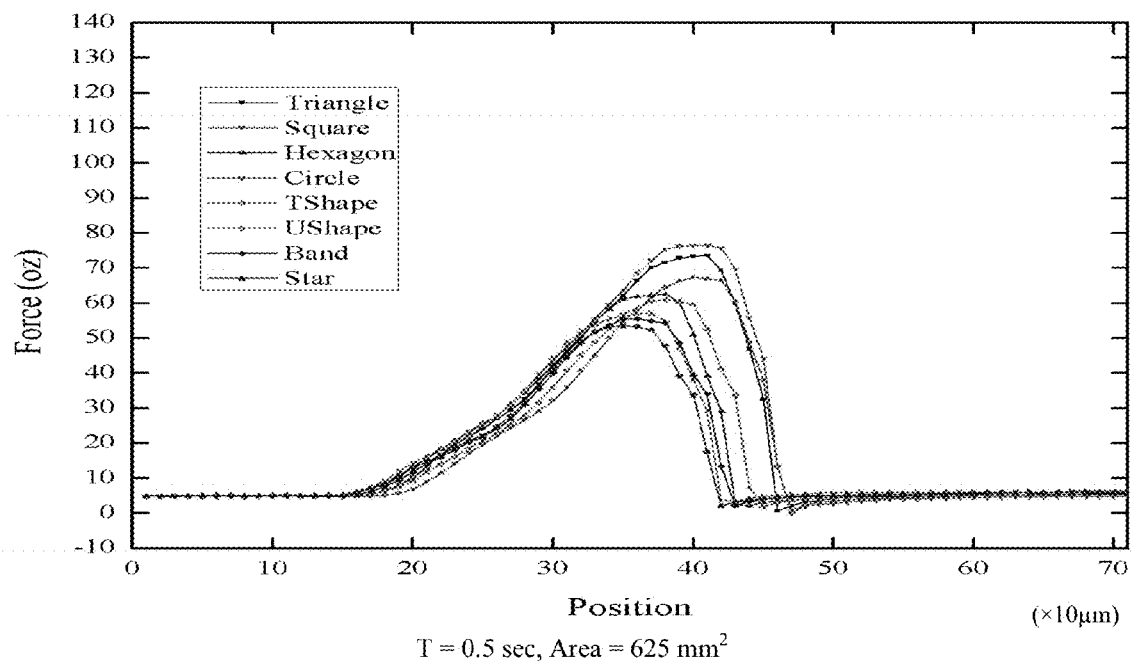
Figure 5C:
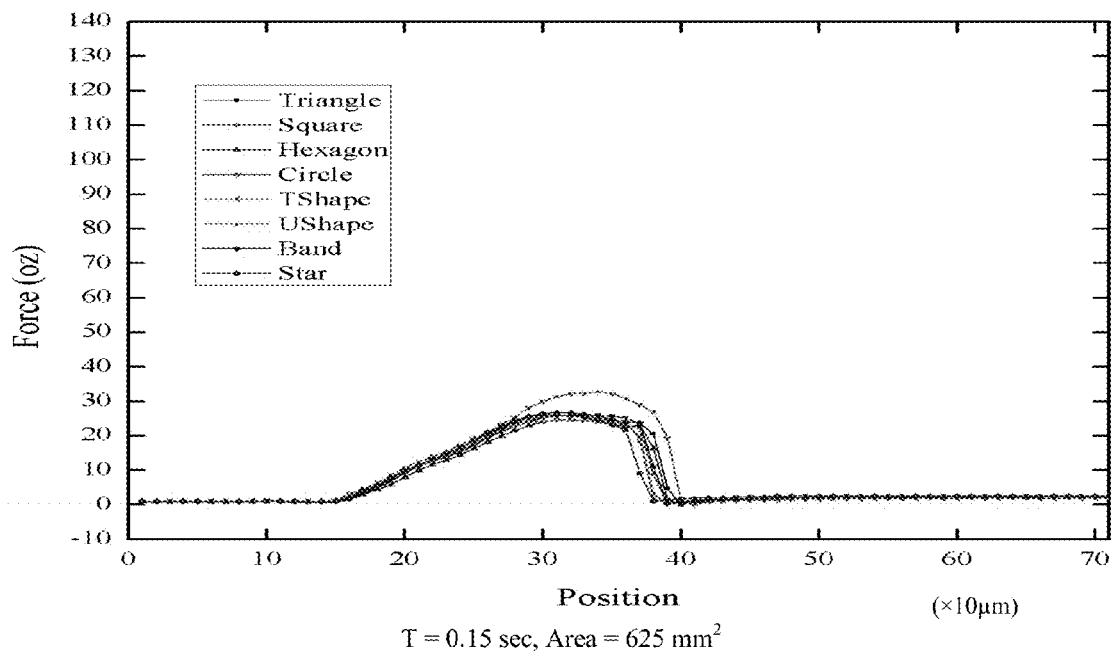
Figure 5D:
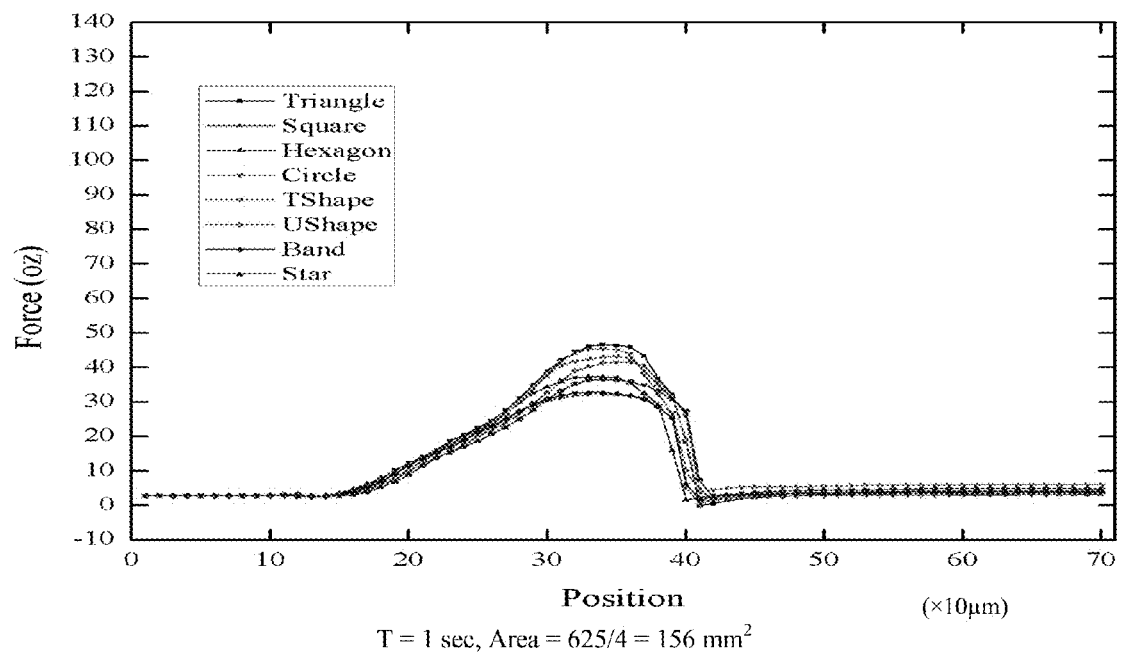
Figure 6:
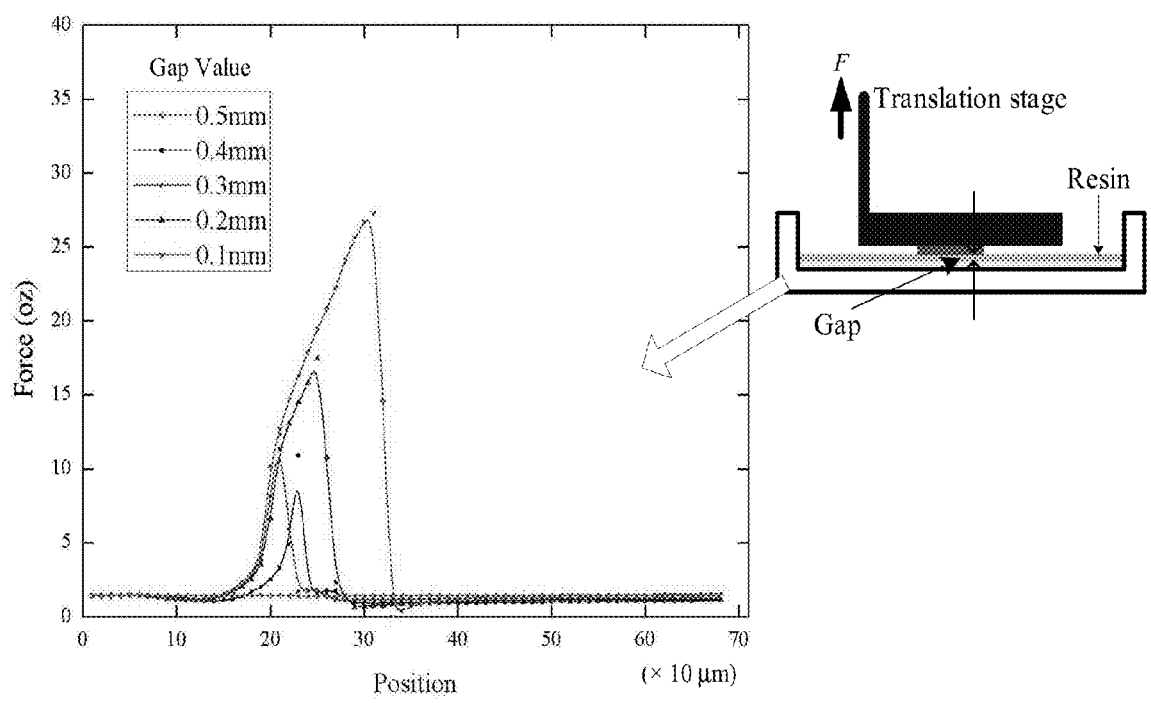
FIG. 6 illustrates an example of forces of pulling a built part from a PDMS film for different gap sizes.

To verify the proposed two-channel system design, physical experiments that are similar to the ones in Section 3.1 have been conducted. A setup similar to FIG. 4A has been used in measuring the separation forces. The same mask images as shown in FIG. 4B have been used in building test layers. The same experiments as described above for the two-channel system design were repeated.

The test results are shown in FIGS. Same—8C. In each figure, the curves record both the sliding and pulling-up stages. The figures show that the force in the Z direction is very small when sliding the resin vat. During the platform pulling-up stage, the peak separation forces are also relatively small (around 2-4 oz or ~0.83 N). The measured forces are only 4-5% of the related measured forces observed in the single channel design. In addition, the variations of the exposure time, the image area and the image shape have smaller effects on separation forces in the new design.

Shearing Forces in the X Direction

Figure 9:
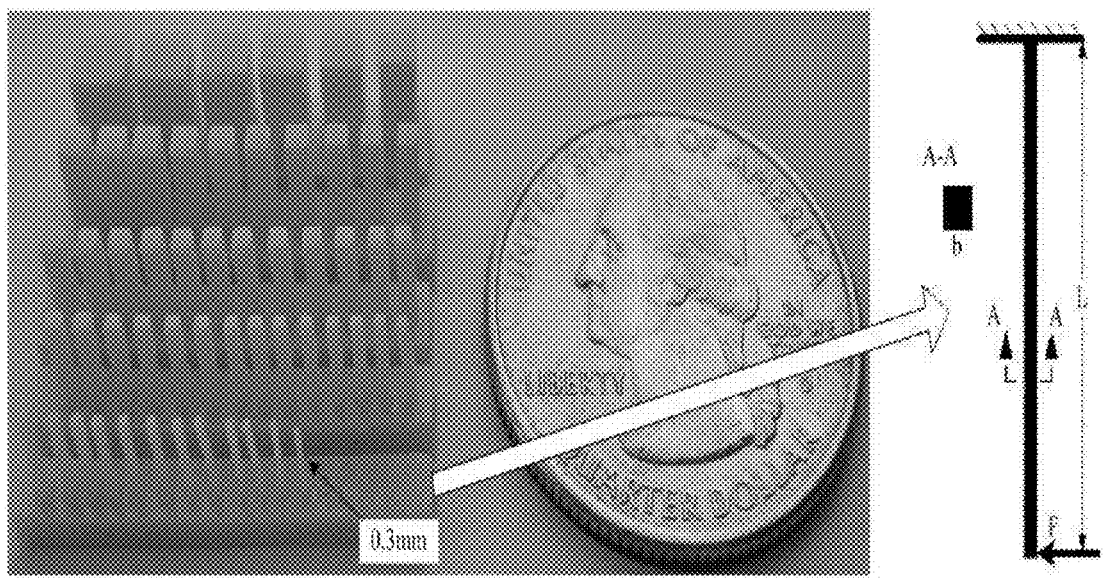
FIG. 9 illustrates an example of a shearing force verification test.

FlexiForce sensors were used in a modified setup to measure the shearing force in the X direction. However, no meaningful readouts were recorded from the sensors due to the small shearing force. To quantitatively estimate the value of the shearing force, a set of square rods with different sizes was built using the two-channel system. The built rods shown in FIG. 9 are 10 mm tall. The minimum cross section size is 0.3×0.3 mm. Rods with even smaller sizes were successfully built. However, the rods were so fragile that they lost the mechanical strength to sustain themselves when the part was taken out of the resin vat and washed in isopropyl alcohol.

For a rod with a cross section size of 0.3×0.3 mm, the upper bound on the tangential force that can be applied on it can be analytically estimated. As shown in FIG. 9, the testing rods in the experiment can be modeled as a cantilever beam. Suppose the length of the beam is L, the size of the beam section is b*b, and the force in the tangent direction is F. The maximum bending stress occurs at the end and can be calculated as:

$\sigma=Mc/I$, where $M=L\times F$, / is the section modulus, $I=b^4/12$, and $c=b/2$. Put them together yields $$\sigma = \frac{6FL}{b^3}.$$

Suppose the allowable bending stress is $[\sigma]$ and the minimal beam section size is $[b]$. This results in the following equation:

$$F \le \frac{[\sigma][b]^3}{6L}.$$

The parameters for this experiment are listed as follows: $[\sigma]=65$ MPa, $[b]=0.3$ mm, and $L=10$ mm. According to the equation, the upper bound of the tangential force may be only 0.03N or 0.11 oz. Compared to the separation force in the Z direction, the shearing force in the X direction may be rather small.

Shallow Vat Study

As discussed before, the challenge of using multiple materials in the MIP-SL process may be managing the contamination between different materials. The proposed two-channel system may lead to a smaller separation force in the bottom-up projection. Hence shallow vats can be used in the MIP-SL process to reduce the material waste and the required cleaning effort. To ensure no contamination between different resin vats, different cleaning strategies have also been explored and identified.

Figure 10:
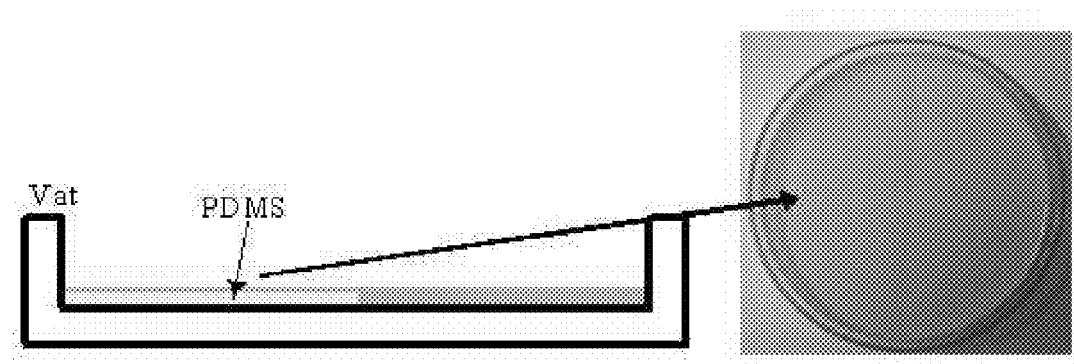
FIG. 10 illustrates an example of minimum thickness of resin on the PDMS surface.

It may be desired to have as little liquid as possible in a resin vat to reduce the contact of the part and liquid resin. However, when the thickness of liquid resin in a tank is too small, islands that have no liquid may appear on the bottom surface due to liquid surface tension. Hence the minimum thickness of liquid resin on the PDMS surface may need to be determined based on the tested resins. A scaled syringe was used to gradually inject resin into the two-channel tank until the resin can fully cover the whole PDMS surface. As shown in FIG. 10, the related thickness for Perfactory SI500 (yellow color) resin is found to be ~0.5 mm. Reducing the viscosity of resin can reduce the surface tension and accordingly the minimum resin thickness. During the building process, a pump can be used to dynamically add liquid resin into the vat to compensate for the material consumption.

Cleaning Resin Residue on Built Layers

Liquid resin may accumulate around the perimeter of the object and at the bottom of the cured layer when it is raised from the vat. To avoid material contamination when changing resin vats, excessive materials on the bottom and the side of part surface may be removed before building a new layer. Various cleaning approaches have been tested. A two-stage cleaning strategy may be based on:

(1) Rough cleaning: a soft brush is moved relative to the part, which can remove the majority of liquid resin on the bottom and the perimeter of the part. The resin collected in the brush tank can be recycled to refill the building tank.

(2) Final cleaning: Due to the surface tension, resin residue can still be found on the part surface after the rough cleaning. To thoroughly clean the resin residue, ultrasound cleaning may be used for final cleaning. After immersing the bottom portion of the built part in a liquid solvent (e.g. 90% isopropyl alcohol and 10% water by volume), high frequency ultrasound vibration may be provided. The applied ultrasound may form microscopic bubbles on the part surface, which may then implode under the pressure of agitation. The generated shock waves may impinge on the part surface. Consequently the resin can be quickly and thoroughly rinsed in all directions. The approach is especially effective for resin inside small cavities, which may be difficult to remove using other cleaning methods.

After final cleaning, the part may be wetted with solvent. It may be dried before being immersed into another material; otherwise, a new layer may not properly adhere to the previous layer. A fan may be used to blow dry air on the part to dry out the alcohol residual. After the part is dry, the building process may resume and layers of a different material can be added.

Figure 11:
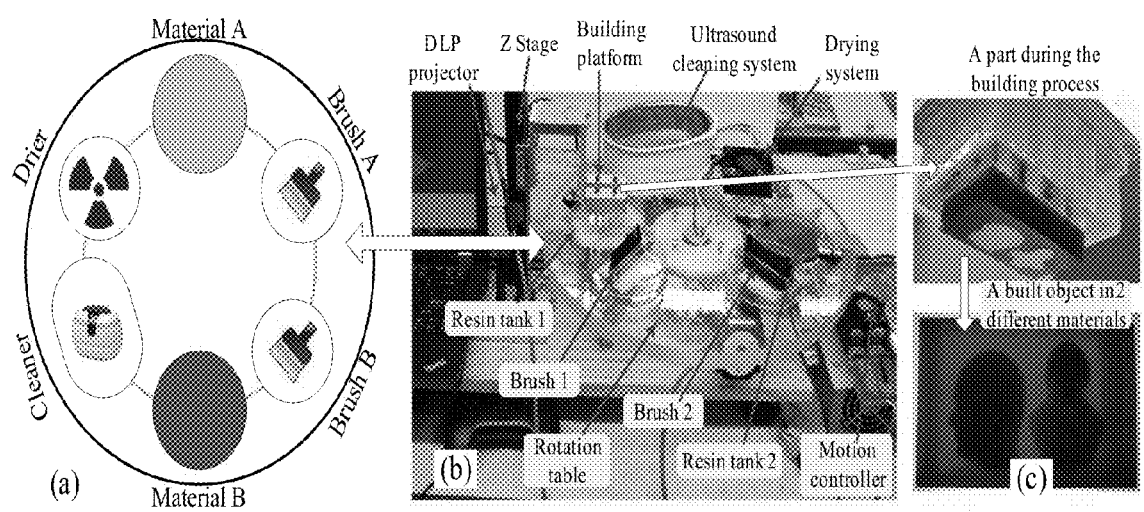
FIG. 11 illustrates an example of a hardware system of a multi-material MIP-SL system.

For two types of materials (A and B), the stations may consist of two resin vats, two brush tanks, an ultrasound cleaner, and a fan (refer to FIG. 11.a). Even though the shallow vat may require only a small amount of material to be cleaned in the system, the cleaning procedure may take the majority of the cycle time, which may significantly reduce the throughput of the whole process. Hence, reducing the number of material alternations may be important in the multi-material MIP-SL system.

Two-Way Movement Design for the Fast MIP-SL Process

The two-way movement design, as discussed in the following sections, may effectively address the large separation force that is problematic, while achieving a fast building speed at the same time.

Two-Way Movement Design

Figure 12:
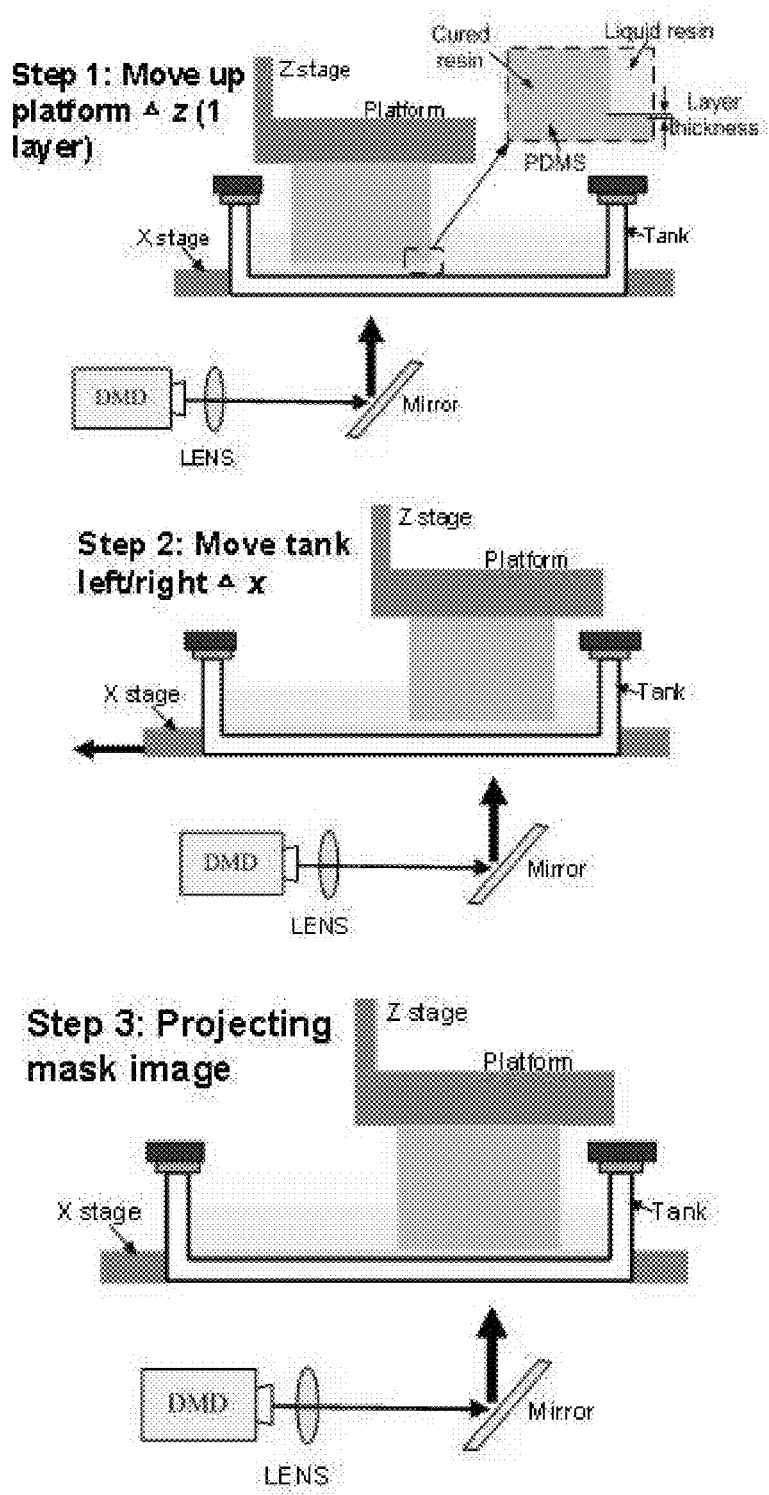
FIG. 12 illustrates an example of an MIP-SL process based on a two-way movement design with PDMS.

An illustration of an example of the fast MIP-SL process based on the two-way movement design is shown in FIG. 12. A transparent PDMS film may first be applied on the bottom surface of a transparent glass vat.

After a mask image is exposed to cure a layer, the platform may be moved up in the Z axis for one layer thickness (e.g. 50 μm). Accordingly, the regions of the PDMS film related to the shape of the cured layer may be pulled up by the suction force. However, the force may be small due to the super elasticity of the PDMS film. There may not be any liquid resin between the cured layer and the PDMS film at this moment.

The tank may be moved along the X axis for a certain distance Δx. A good property of the PDMS film is that a very thin oxygen-aided inhibition layer (~2.5 μm) is formed near the PDMS film that can provide a non-polymerized lubricating layer for easy sliding. See Han, L., Suri, S., Schmidt, C. E., and Chen, S. (2010), "*Fabrication of three-dimensional scaffolds for heterogeneous tissue engineering*", Biomed Microdevices, 12, 721-725. If the moving distance is sufficiently large (e.g. larger than the extent size of the cured layer in the X axis), the elastic deformation of the pulled-up PDMS film may be released by such a sliding movement. Hence, at the end of the X movement, liquid resin may be filled in the small gap between the cured layer and the PDMS film.

The mask image of a new layer can now be projected at the bottom surface to cure the next layer. These three steps can then be repeated by moving the tank in an opposite direction. Note that, to achieve the motion in the X direction, only the tank and the related frame may need to be moved. There may be no relative motion between the platform and the projection device. Hence the XY accuracy of the MIP-SL system may not be affected by the X translations.

Separation Force Study Based on Two-Way Movement Design

To verify the proposed two-way movement design, a set of experiments were conducted. The same set of mask patterns were used in building test layers. The same exposure time and layer thickness were used (1 second and 0.2 mm respectively).

Figure 13A:
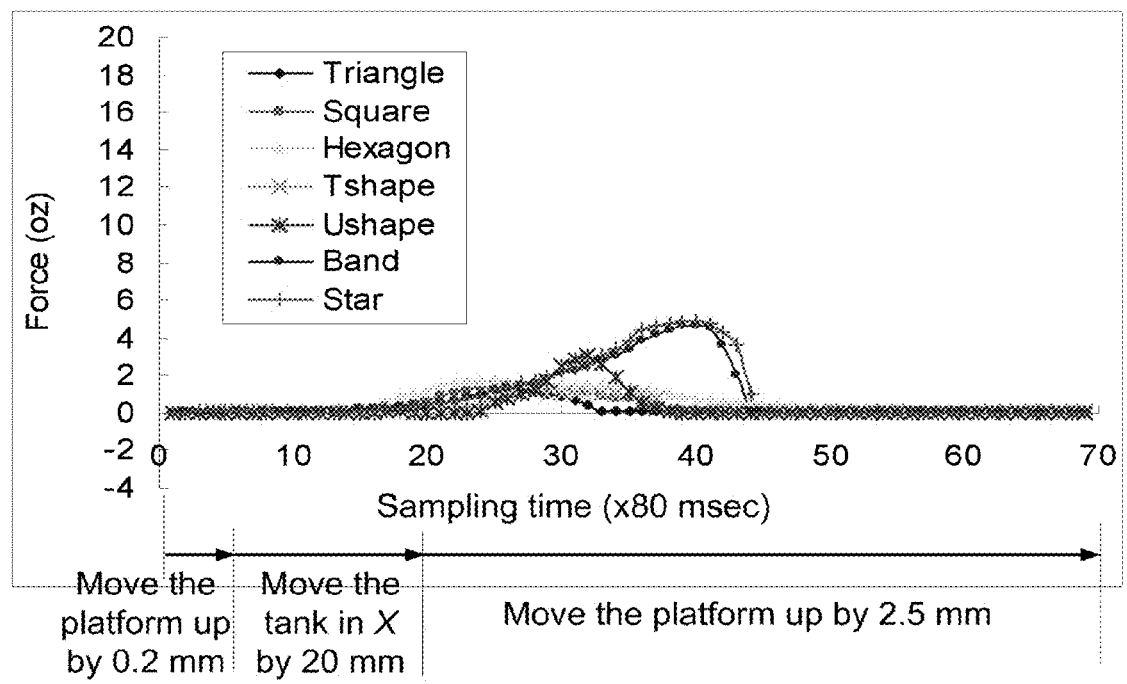
FIG. 13A and FIG. 13B illustrate an example of pulling-up forces of a cured layer based on the two-way movement design in different settings.
Figure 13B:
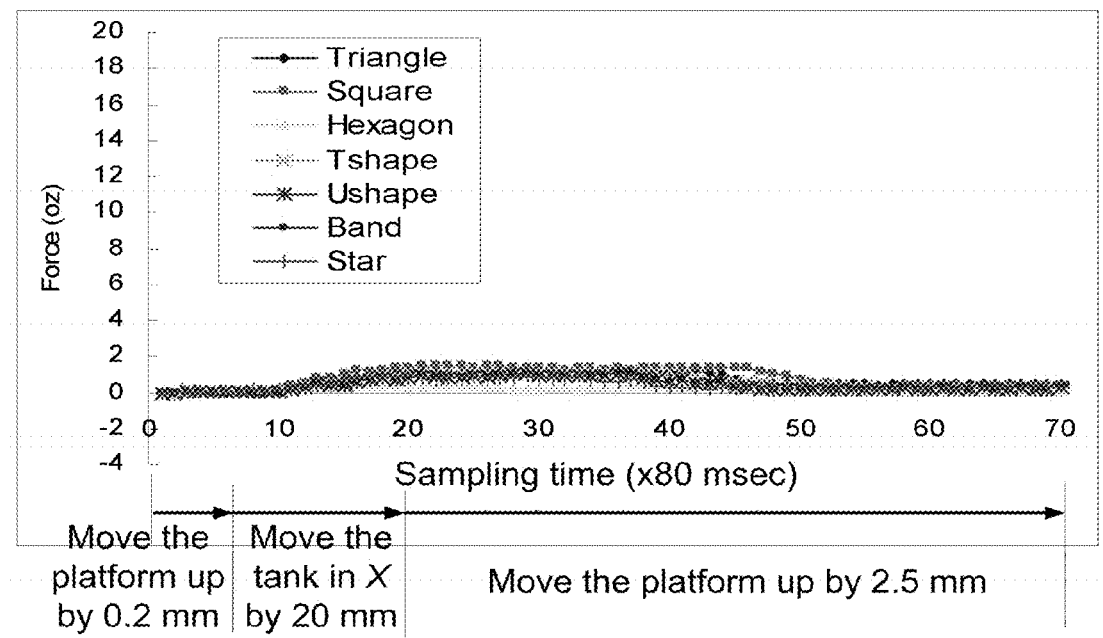

The building process as shown in FIG. 12 was used in building a set of layers. In the tests, the tank was translated in the X axis by 20 mm. The moving speed was set at 25 mm/sec. After the layers have been built, the pulling-up forces in the Z axis during building the next layer were recorded. However, instead of curing a new layer as shown in Step 3, the part is moved up slowly at 0.6 mm/sec for 2.5 mm. The measured forces of a sensor in the Z axis during the aforementioned three steps are shown in FIG. 13. In each figure the curves record the test results based on a sampling resolution of 80 milliseconds.

The figures show that the force in the Z direction may be rather small when the platform is moved up by 0.2 mm. During the remaining two steps (i.e. sliding on the PDMS film and the platform pulling-up), the peak separation forces are also relatively small (around 2-6 oz or 0.56-1.67 N). Such measured forces may be only 3-4% of the related ones as shown in FIG. 4. Hence the two-way movement design can effectively reduce the large separation force in the bottom-up projection system.

Shearing Force Study in the X Axis

Figure 14:
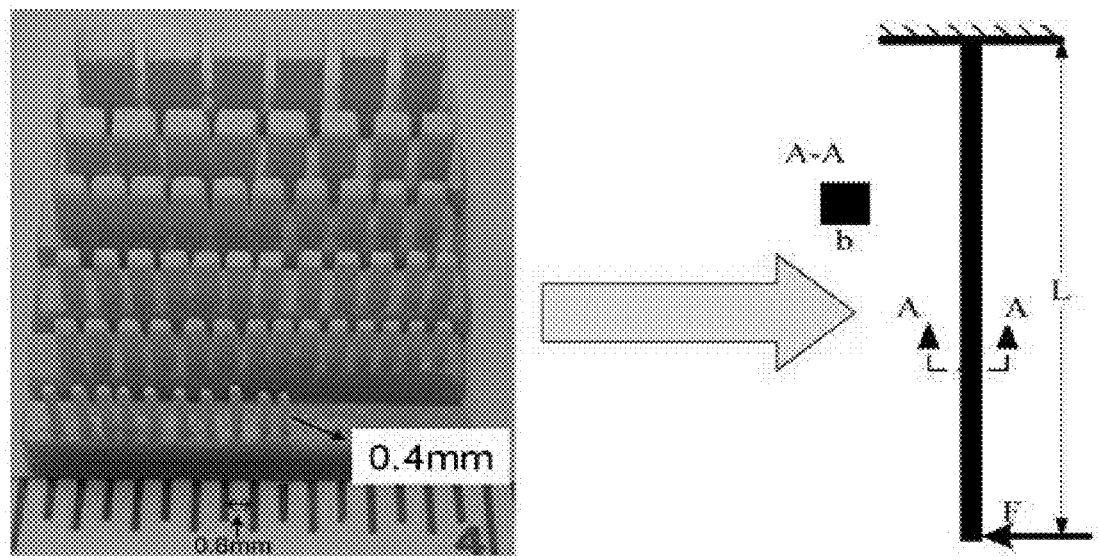
FIG. 14 illustrates an example of a shearing force verification test.

In the two-way movement design, cured layers can easily slide on the PDMS surface. The FlexiForce sensors were used in a modified setup to measure the shearing force in the X direction. However, no meaningful readouts were recorded from the sensors. To quantitatively estimate the value of the shearing force in the X axis, a set of square rods with different sizes were built using the two-way movement design. The built rods shown in FIG. 14 are 10 mm tall. The minimum cross section size is 0.4×0.4 mm. Rods with even smaller sizes were successfully built. However, the rods were so fragile that they lost the mechanical strength to sustain themselves when the part was taken out of the resin vat and washed in isopropyl alcohol.

Nevertheless, for a rod with a size of 0.4×0.4 mm, the maximum tangential force that can be added on it can be analytically estimated. As shown in FIG. 14, the testing rods in the experiment can be modeled as a cantilever beam. Suppose the length of the beam is L, the size of the beam section is b×b, the force in tangent direction is F. The maximum bending stress at the end can be calculated as: $\sigma = Mc/I$, where I is the section modulus, $I = b^4/12$, and $c = b/2$. Substituting these values for their variables, the resultant equation is $$\sigma = \frac{6FL}{b^3}.$$

Suppose the allowable blending stress is $[\sigma]$ and the minimal beam section size is $[b]$. The following equation results:

$$F \leq \frac{[\sigma][b]^3}{6L}.$$

The material used in the tests has the following parameters: $[\sigma] = 65$ MPa, $[b] = 0.4$ mm, $L = 10$ mm. According to the equation, the upper bound of the tangential force is only 0.07N or 0.25 oz. Compared with the separation force in the Z direction, the shearing force in the X direction may be rather small.

6.4 Two-Way Movement Settings

The two-way movement design may enable the quick spreading of liquid resin into a uniform thin layer. In addition, the DMD-based digital mask projection may enable the fast curing of the spread liquid resin into a desired solid layer. Consequently, for a given 3D CAD model, a fast MIP-SL process may be able to fabricate a physical object within a short building time. The curing characteristics and the two-way movement settings of the developed MIP-SL process are presented as follows. A detailed analysis of its building time is also discussed.

After an image is exposed for a certain time ($T_{projection}$), a waiting time, $T_{wait\_projection}$, may be required before the layer can be moved up for one layer thickness (i.e. Step 1 in FIG. 12). Such a waiting time may be critical in order for the acrylate resin to complete the solidification process and gain sufficient strength for the Z movement. Otherwise, the building process may fail. The waiting time may be dependent on the resin's curing property. Due to the fast photospeed of the acrylate resins, the waiting time in the system described herein may be short (~300 milliseconds in tests).

In the two-way movement design, the cured part may first be moved up for one layer in the Z axis and the tank may then be translated in the X axis for a certain distance. The two linear movements may have different accuracy and speed requirements.

The Z movement may need to be accurate since it may determine the layer thickness of the next layer. The Z stage may also need to have a resolution that is much smaller than a layer thickness. Accordingly, to ensure the desired accuracy and resolution, the acceleration and velocity values in the Z movement may be small. The slow movement of the cured part may also enable the PDMS film to fully elastically deform for a small attaching force. However, the movement time in the Z axis ($T_Z$) may still be reasonably short (~0.4 second in tests), since only a small moving distance may be required (e.g. 50 or 100 μm).

The tank may need to be moved in the X axis for a certain distance to release the elastic deformation of the PDMS film. The X moving distance may be related to the shape and size of the cured layer, and less than the extent size of the cured layer in the X axis. Since the relative position of the platform and the projection system may not change during the X movement, the accuracy and resolution requirements on the X movement may not be as high as those on the Z movement. Hence a much larger acceleration and velocity can be applied in the X movement to reduce the movement time in the X axis ($T_X$).

In a test bed, a Z linear stage was used with a thread of 0.5 mm/round, and a X linear stage with a thread of 25.4 mm/round. The moving time for different displacement distances in a prototyping system was calibrated for both linear stages. The results are plotted as lines in FIG. 15 for the Z and X stages, respectively. As shown in the figure, the movement in the Z axis may be much slower than that in the X axis. The movement time required to complete a moving distance in the X axis can be identified based on the calibration data.

After the X movement, another waiting time, $T_{wait\_X}$, may be required in order for the flowing liquid resin to settle. Otherwise, the building process may fail. The waiting time caused by the X motions may be related to the movement distance and the moving speed. Due to the small gap between the cured part and the PDMS film, the required waiting time is typically short (~100 milliseconds). After the waiting time of $T_{wait\_X}$, the liquid resin may form a uniform thin layer, which may be ready for the next layer to be built. The process can then be repeated after the related mask image is exposed.

The Building Time of a Layer

Figure 16:
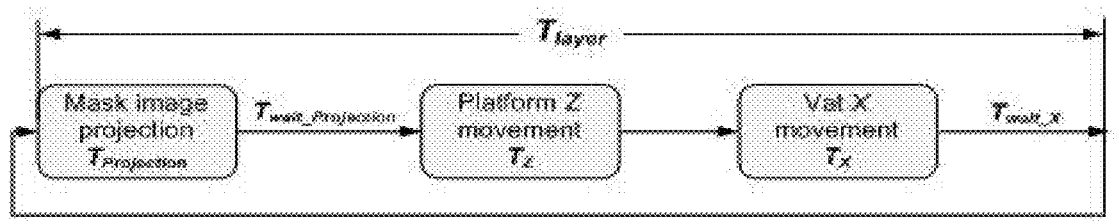
FIG. 16 illustrates an example of building time of a layer in a two-way movement based MIP-SL process.

As shown in FIG. 16, the building time of each layer may thus be the sum of all the aforementioned steps:

$$T_{Layer} = T_{Projection} + T_{wait\_Projection} + T_Z + T_X + T_{Wait\_X}.$$

The first two items, $T_{Projection}$ and $T_{wait\_Projection}$, may be related to the curing characteristics of the photopolymer resins used in the MIP-SL process. The photopolymer resins based on acrylate chemistry can be quickly cured. A stronger light source used in the projection system may further reduce the projection time $T_{Projection}$.

The other three items, $T_Z$, $T_X$, and $T_{Wait\_X}$, may be related to the two-way movement design. $T_Z$ may be related to the layer thickness and the moving velocity in the Z axis. $T_X$ may be related to the size of the cured layer and the moving velocity in the X axis. A linear stage with a higher speed can be used to further reduce the movement time $T_X$. $T_{Wait\_X}$ may be determined by the gap distance between the PDMS and the cured layer, the moving velocity of the tank, the shape of the cured layer, and the flow properties of the liquid resin. For a typical layer thickness that is usually small, $T_{Wait\_X}$ may be reasonably short (~100 millisecond in tests).

Te projection time $T_{Projection}$ for the first few layers may be much longer (e.g. 3-4 seconds) to ensure the initial layers can be strongly bonded to the build platform, For all the other layers, the total building time of a layer may be usually short (a few seconds in our tests). Hence a fast fabrication speed can be achieved in the developed process (e.g. building 3 mm height per minute).

Experimental Setups

Multi-Material System

A prototype system has been built for verifying the presented methods. The hardware setup of the developed multi-material MIP-SL system is shown in FIG. 11B. In the system, an off-the-shelf projector (CASIO XJ-S36) was used. The use of a commercial projector can significantly reduce the prototype cost and simplify the system design. The optical lenses of the projector were modified to reduce the projection distance. Various projection settings including focus, key stone rectification, brightness and contrast were adjusted to achieve a sharp projection image on the designed projection plane. The DMD resolution in the system is 1024×768 and the envelope size is set at 48×36 mm. A linear stage from VELMEX Inc (Bloomfield, N.Y.) is used as the elevator for driving the platform in the Z axis. A rotary table also from VELMEX Inc is used to rotate the resin vats and cleaning stations. A high performance 4-axis motion control board with 28 Bi-directional I/O pins from Dynomotion Inc. (Calabasas, Calif.) is used for driving the linear stages and controlling the ultrasound cleaner, the fan, and a shutter, which may be part of the process controller that was described above. Two flat and clear glass Petri dishes are used as resin tanks. A PDMS film (Sylgard 184, Dow Corning) is coated on each glass dish. FIG. 11.c shows the building of a test part in two materials.

Figure 17A:
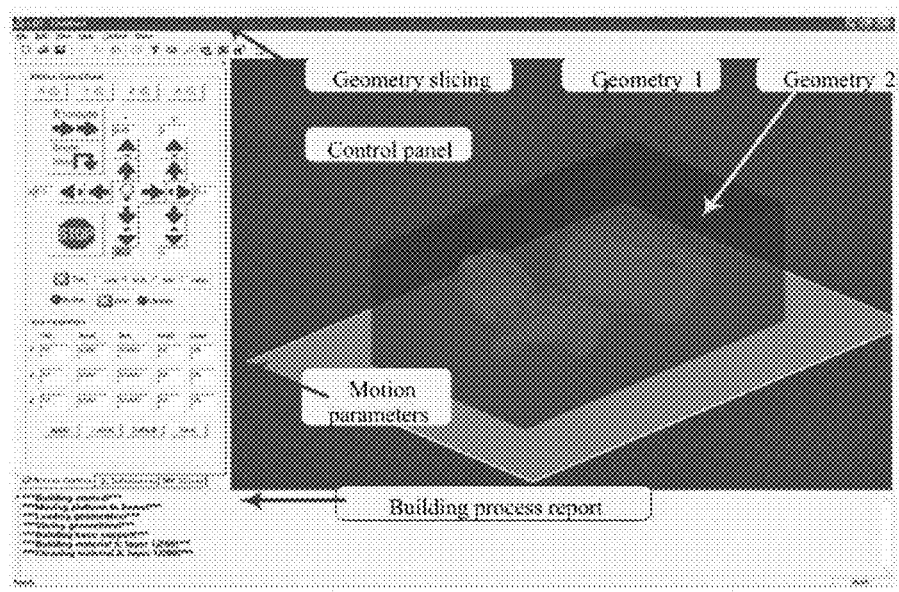
FIG. 17A and FIG. 17B illustrate an example of a process of a multi-materials MIP-SL system and a related software system that may be used to implement the process.
Figure 17B:
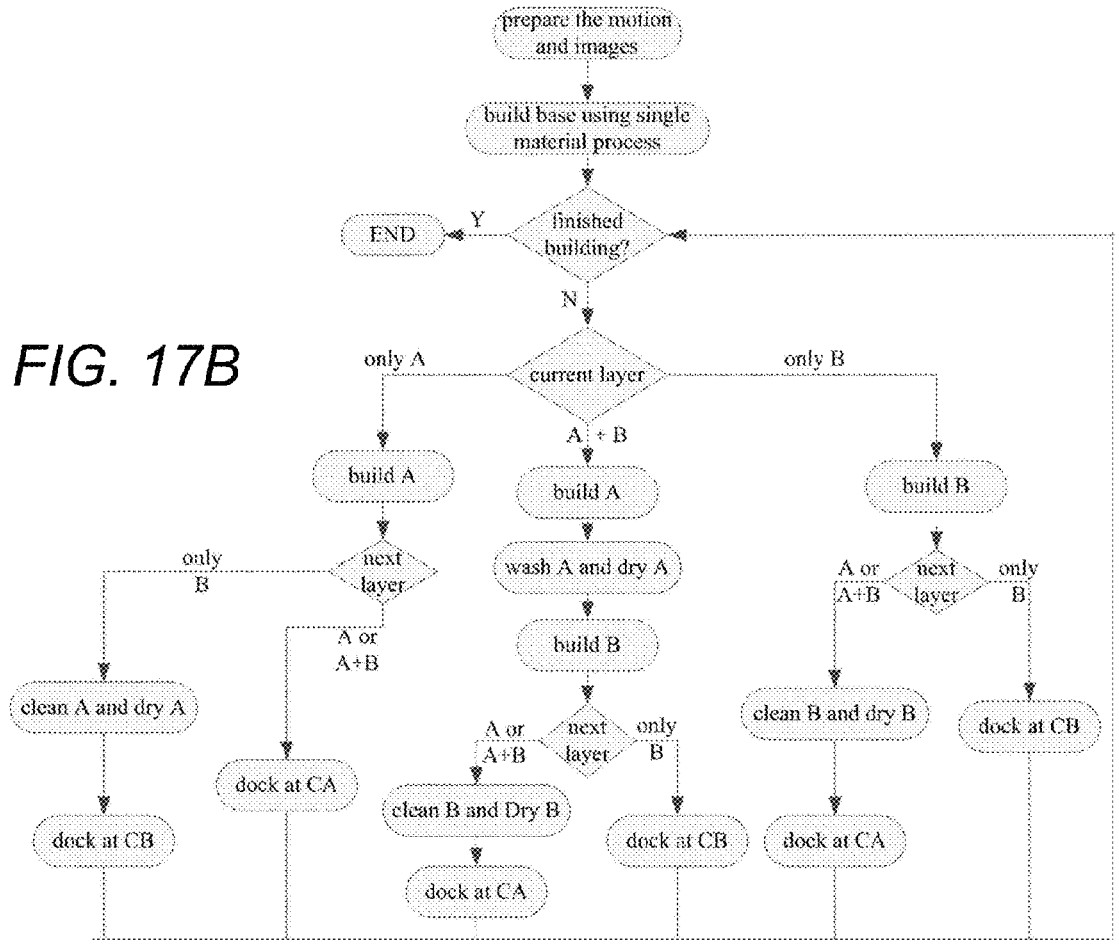

FIG. 17B shows a flowchart of an example of the multi-material MIP-SL process. The part may only be cleaned during the transitions between building layers in different materials. If the same material is used in a single layer or two neighboring layers, then no cleaning may be performed. The building sequence of two materials in neighboring layers (i.e. $A_i \rightarrow B_i \rightarrow B_{i+1} \rightarrow A_{i+1} \rightarrow \ldots$) was alternated, such that less material switchover was needed. A related multi-material MIP-SL software system has been developed using the C++ programming language with Microsoft Visual C++ compiler. A graphical user interface (GUI) of the developed software system is shown in FIG. 17A. The software system can synchronize the image projection and motion control based on geometry processing.

Fast Single-Material System

Figure 18:
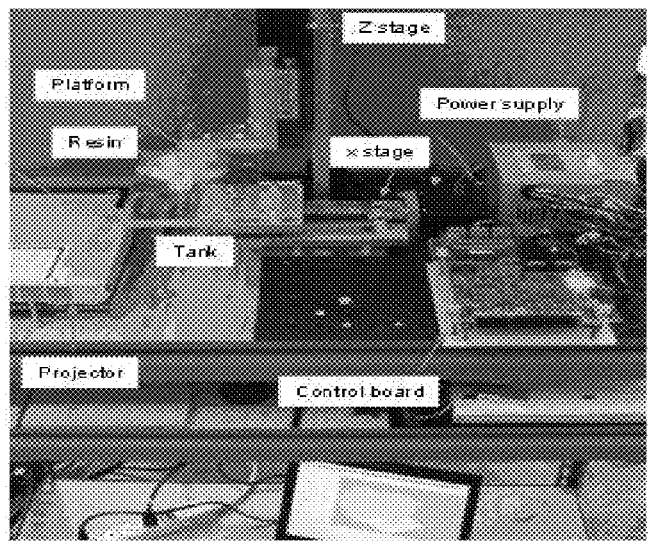
FIG. 18 illustrates an example of a prototype hardware system for a fast MIP-SL process.

A prototype system has been built to verify the developed process. The hardware setup of the fast MIP-SL system is shown in FIG. 18. In the designed system, an off-the-shelf projector (CASIO XJ-S36) was used. The optical lenses of the projector were modified to reduce the projection distance. Various projection settings including focus, key stone rectification, brightness and contrast were adjusted to achieve a sharp projection image on the designed projection plane. The DMD resolution in the system is 1024×768 and the envelope size is set at 48×36 mm. A precise linear stage from Aerotech Inc (Pittsburgh, Pa.) is used as the elevator for driving the platform in the Z axis. A fast linear stage from Servo Systems Co. (Montville, N.J.) is used to drive the tanks back and force in the X axis. A high performance 4-axis motion control board with 28 Bi-directional I/O pins from Dynomotion Inc. (Calabasas, Calif.) is used for driving the linear stages. A flat and clear glass Petri dish is used as resin tank. A PDMS film (Sylgard 184, Dow Corning) is coated on the glass dish.

Figure 19A:
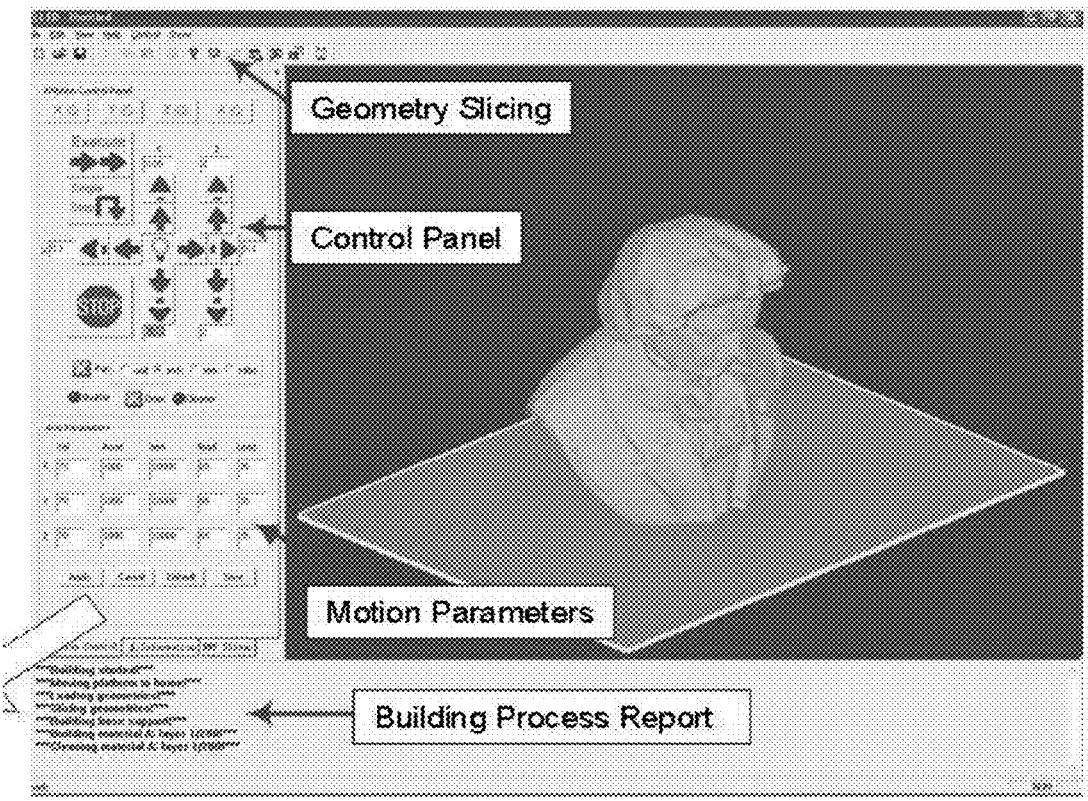
FIG. 19A and FIG. 19B illustrate an example of a process of a fast MIP-SL system and a related software system that may be used to implement the process.
Figure 19B:
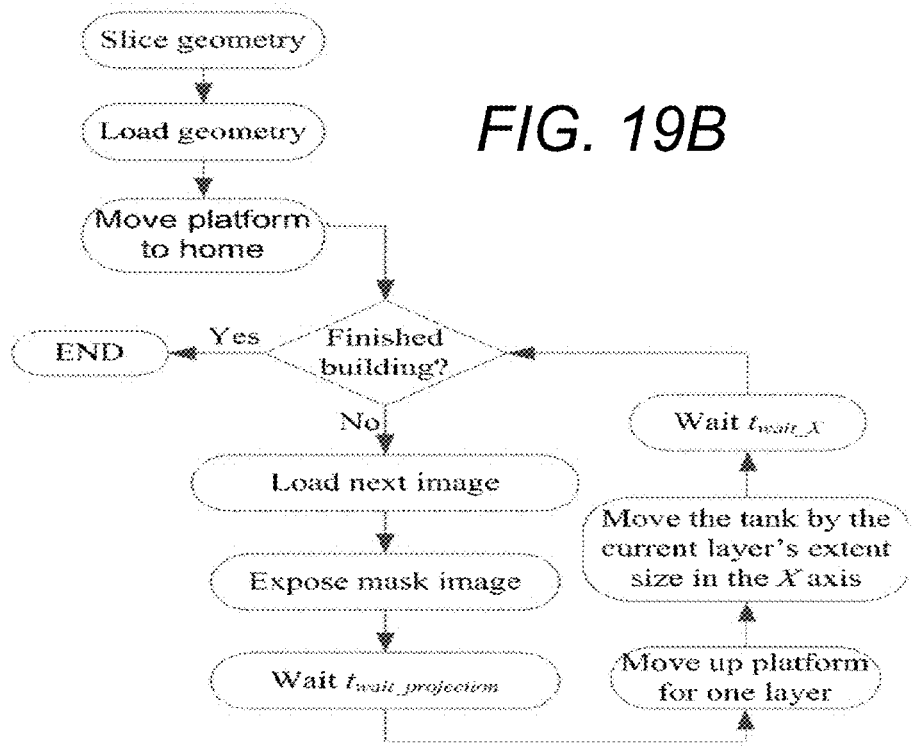

A mask planning testbed has been developed using the C++ language with Microsoft Visual C++ complier. The testbed integrates the geometry slicing and the motion controlling. It also synchronizes the image projection with the X and Z movements. The graphical user interface (GUI) of the developed software system is shown in FIG. 11. The flowchart of the fast MIP-SL process is also shown in FIG. 19B.

Results and Discussion

A set of test cases has been designed to verify the developed prototype system of fabricating objects with different combinations of multiple materials. The experimental results have demonstrated that the presented two-channel bottom-up projection based approach can successfully build parts with desired material distributions. Although the developed prototype system can only use up to two different materials, the method can be extended in a straight forward manner to fabricate objects with three or more materials. Tests have been also performed to verify the building speed of the developed prototyping system. The results of the designed tests have demonstrated that the presented MIP-SL process can build 3D models in minutes instead of hours.

Components of Multi-Materials Tests

A purpose of using multiple materials in a component may be to provide additional functionality in the built part, such as varying colors, electrical conductivity, or mechanical properties.

Figure 20A:
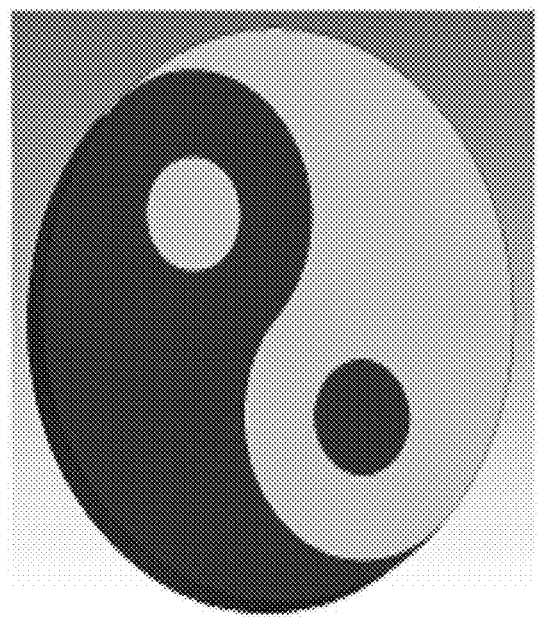
FIG. 20A and FIG. 20B illustrate an example of a test case for building an object with different colors.
Figure 20B:
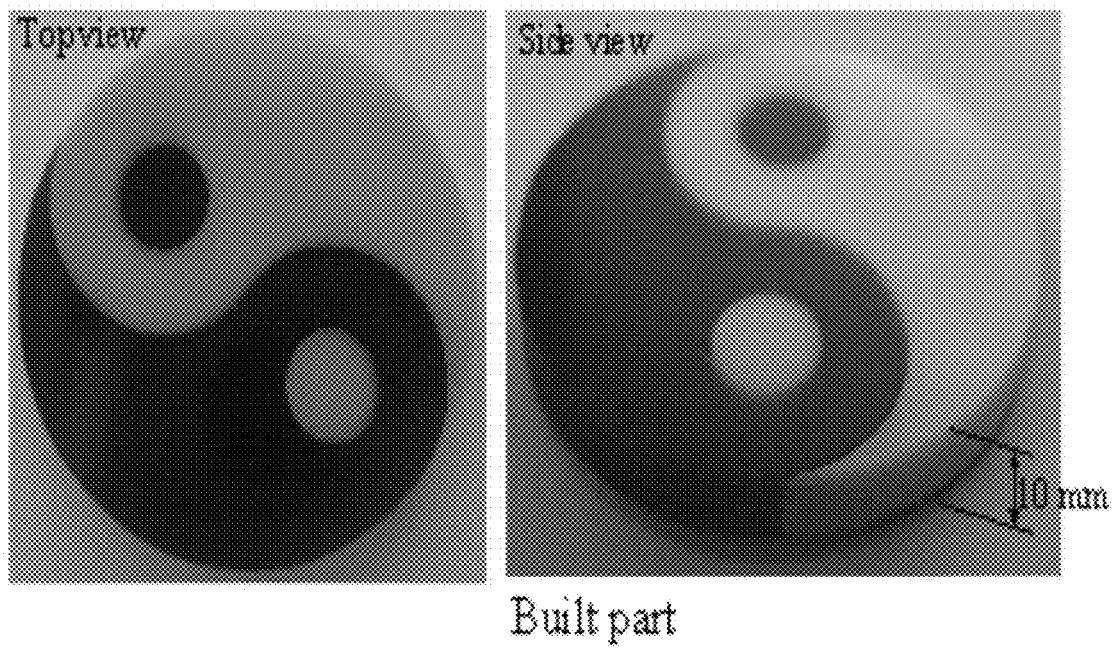

Verification of building objects with different colors: A test case based on the famous symbol of bagua is used to verify the bonding between two different materials (yellow and red resins) and to demonstrate the capability of the prototype system in building objects with different colors. The designed CAD model is shown in FIG. 20A. Accordingly, the built object is shown in FIG. 20B.

Verification of Building Objects with Different Electrical Conductivities

Figure 21A:
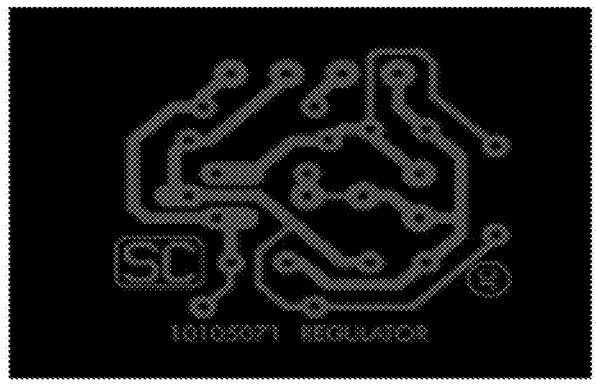
FIGS. 21A-21C illustrate an example of a test case for building an object with different electrical conductivities.
Figure 21B:
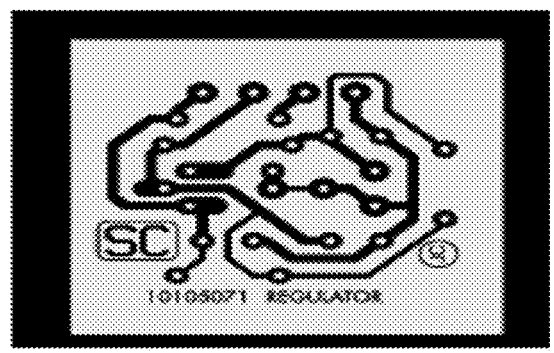
Figure 21C:
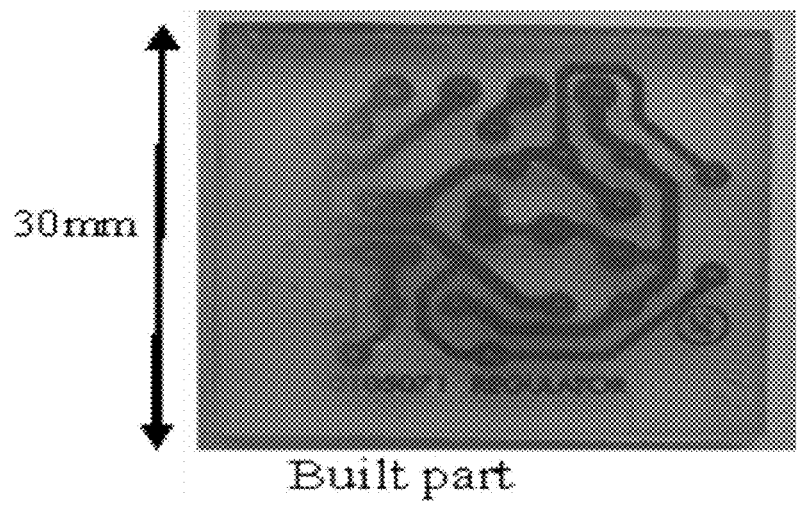

Although most Acrylate or Epoxy resins are electrically insulating, with proper modification a resin can become conductive (for example silver-filled epoxies). Embedding electrical circuits inside a 3D part is very meaningful for electrical and electronic design. In this way, a circuit with different shapes and different orientations can be achieved (e.g. 3D circuit). In addition, the circuit can be designed to be adaptive to the target object shape (e.g. curved surfaces). A designed test case is shown in FIG. 21A-21C. Masks A and B are the projection image for the conductive and insulative materials, respectively (red and transparent resins). The built part is shown in FIG. 21C, which verifies that the proposed method can be successfully used in the application.

Verification of Building Objects with Different Mechanical Properties

Figure 22A:
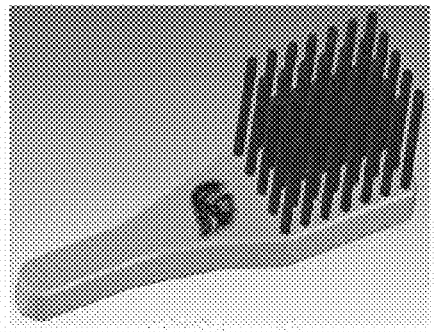
FIGS. 22A and 22B illustrate an example of a test case for building an object with different mechanical properties.
Figure 22B:
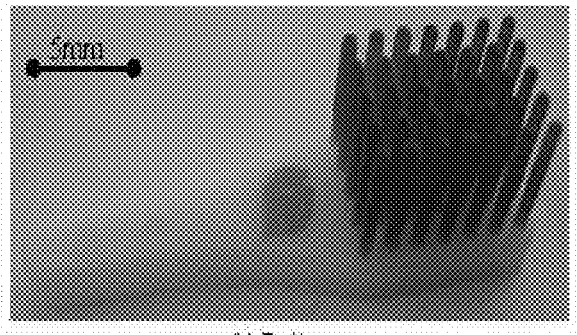

Another typical application of using multiple materials is in improving the mechanical properties of designed components. For example, some portions of a product component may be soft while others may be rigid. For this purpose, a designed test case is shown in FIG. 22A. The brush is composed of two portions: the base and the brush-head. These portions have different flexibility requirements, i.e. the base needs to be rigid while the brush-head needs to be soft and flexible. Two different materials (white and red resins) that have different mechanical properties are used in building the designed brush. The built object is shown in FIG. 22B. In addition, a USC's Trojans logo with red material is embedded inside the white base. Based on the built part, the mechanical performances of the base and the brush-head are different.

Verification of Building Objects with Digital Materials

Figure 23:
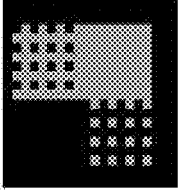
FIG. 23 illustrates an example of a test case for building an object with digital materials.
Figure 26A:
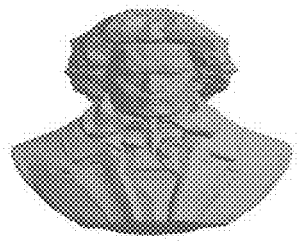
FIGS. 26A-26C illustrate an example of a test statue.
Figure 26B:
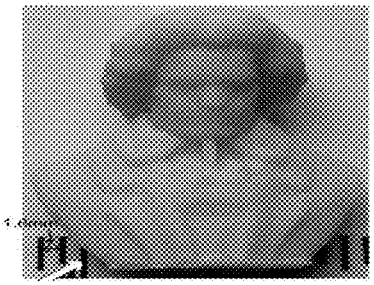
Figure 26C:
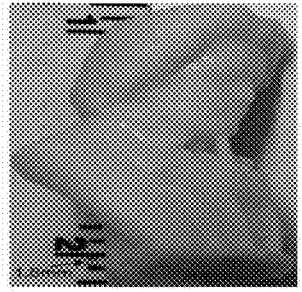
Figure 26D:
Figure 26E:
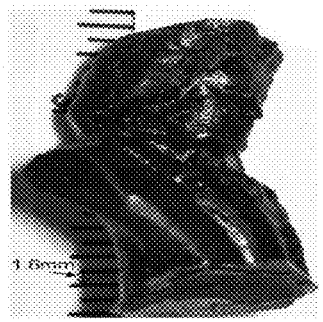
Figure 27A:
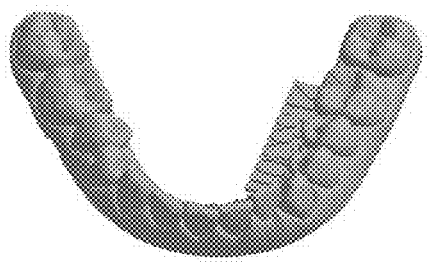
FIGS. 27A-27C illustrate an example of test teeth.
Figures 27B, 27C:
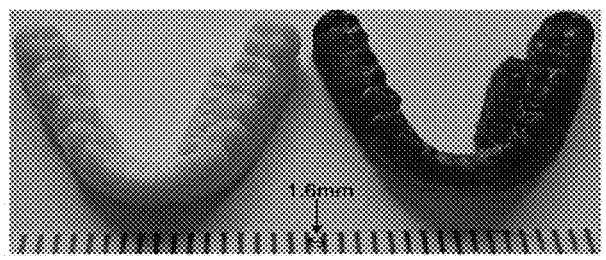
Figure 28A:
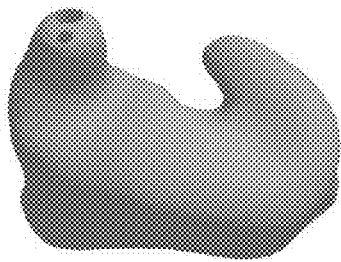
FIGS. 28A-28C illustrates an example of a test hearing aide shell.
Figure 28B:
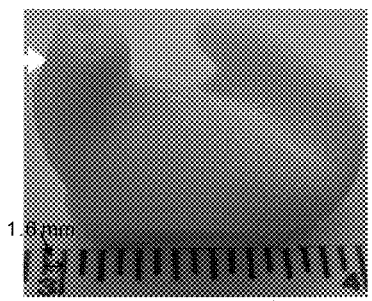
Figure 28C:
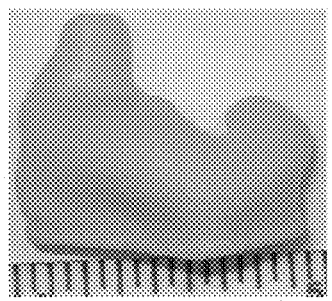
Figure 29A:
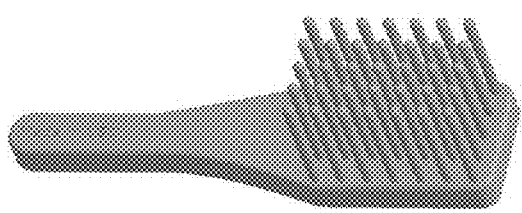
FIGS. 29A-29B illustrate an example of a test brush.
Figure 29B:

As demonstrated by the OBJET Connex family, a feature of digital materials may be that two base materials can be combined in specific concentrations and structures. Therefore, product components can have desired properties that may be different from those of the base materials. Accordingly, a designed test case is shown in FIG. 23. A four grid slab with four different combinations of two materials (red and yellow resins) is shown. The ratios of the two materials are 100% vs. 0%, 75% vs. 25%, 25% vs. 75%, and 0% vs. 100%, respectively. Using a halftoning method called dithering, see Lieberman, D and J P Allebach (1997), *Efficient model based halftoning using direct binary search*, in Proc. 1997 IEEE Int. Conf, Image Processing, Santa Barbara, Calif., different combinations of two materials may be obtained by applying different dithering matrix. The built objects are also shown in the figure. The results demonstrate that the prototype system can mix two materials in predefined proportions to produce isotropic materials with different material properties.

Components of Fast Single-Material Tests

A set of CAD models with different complexity were used in tests. The screenshots of six input CAD models are shown in FIGS. 24-29. The related STL files have triangle numbers ranging from several hundreds to 1.2 million:

100 μm layer thickness was used in their building processes. Due to the larger layer thickness, a longer image exposure and projection waiting times were used (0.45 and 0.3 second respectively in the tests). Accordingly the Z movement may also take a longer time for a larger layer thickness. In the tests, the movement time in the Z axis ($T_Z$) is 0.32 and 0.42 second for the layer thickness of 50 μm and 100 μm, respectively.

The required moving distance in the X axis may be related to the size and shape of the cured layer. For a layer with a big cross-section area (e.g. the models of a head and a statue), the X translation distance may be set to a value that is close to the X extent size. Due to the large movement, the X waiting time was also set longer. In comparison, for a layer with a small cross-sectional area (e.g. the models of a hearing aid shell and the top portion of a brush), the X translation distance can be much smaller than the extent size of the layer in the X axis. However, due to the fast moving speed in the X axis, the differences on $T_X$ may be small (less than 1 second as shown in Table A above).

Two types of resins, SI500 and Acryl R5, were tested. Their curing characteristics may be slightly different. For the same layer thickness, the curing of Acryl R5 takes ~0.1 second longer than that of SI500. The viscosities of the two resins may also be slightly different. However, the same settings can be used in the two-way movement design based on the two resins.

FIGS. 24-29 show the built objects based on the developed fast MIP-SL process. The quality of the built objects was examined to be satisfactory. Both surface finish and dimension were analyzed to be acceptable. In our prototyping system, the nominal size of a pixel is 47 μm. The fine image resolution enables the meso-scale features (i.e. in the range of 0.1-1 mm) to be well captured in the built physical objects, e.g. the lip of the human head, the cloth folds in the Beethoven statue, and the dentures in the teeth model.

All the models shown in FIGS. 24-29 were built within 12 minutes using our prototyping system. The models with less than 100 layers (e.g. the gear, the teeth, and the brush) may only require 2-3 minutes to be built. A statistic of the building

TABLE A

Building time statistics

Figure 15:
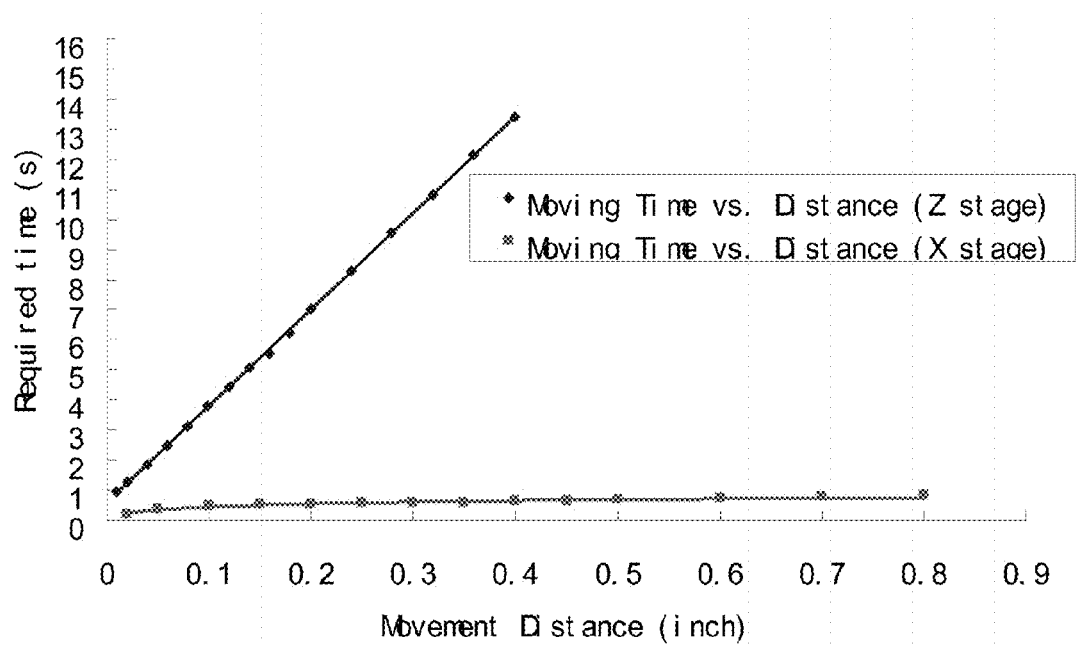
FIG. 15 illustrates an example of movement time in the X and Z axes of a prototyping system.

| Model | Gear | Head | Statue | Teeth | Shell | Brush |
|---|---|---|---|---|---|---|
| Figure # | FIG. 12 | FIG. 13 | FIG. 14 | FIG. 15 | FIG. 16 | FIG. 17 |
| Tri # | 660 | 24190 | 5204 | 133806 | 32762 | 1259246 |
| $Size_X$ (mm) | 25.4 | 25 | 17.7 | 24 | 24 | 7.6 |
| Thickness (mm) | 0.05 | 0.1 | 0.1 | 0.1 | 0.1 | 0.1 |
| $T_{projection}$ (sec) | 0.35 | 0.45 | 0.45 | 0.45 | 0.45 | 0.45 |
| $T_{wait\_projection}$ (sec) | 0.1 | 0.3 | 0.3 | 0.3 | 0.3 | 0.3 |
| $T_Z$ (sec) | 0.32 | 0.42 | 0.42 | 0.42 | 0.42 | 0.42 |
| $Move_X$ (mm) | 7.6 | 25 | 12.7 | 2.5 | 2.5 | 6.35 |
| $T_X$ (sec) | 0.58 | 1.1 | 0.67 | 0.46 | 0.46 | 0.56 |
| $T_{X\ Wait}$ (sec) | 0.05 | 0.1 | 0.1 | 0.05 | 0.05 | 0.05 |
| $T_{Layer}$ (sec) | 1.4 | 2.37 | 1.94 | 1.68 | 1.68 | 1.78 |
| $Height_Z$ (mm) | 4.93 | 28.5 | 30.5 | 7.3 | 22.3 | 8.3 |
| Layer # | 98 | 285 | 305 | 73 | 223 | 83 |
| $T_{total\_building}$ (min) | 2.31 | 11.26 | 9.86 | 2.04 | 6.24 | 2.25 |

Two different layer thicknesses used in the MIP-SL process were tested. A 50 μm layer thickness was used in the fabrication of a gear model. The mask image projection time was 0.35 second for each layer except the base. The projection waiting time was set at 0.1 second. For all the other models, a time is given in the table above. A much larger exposure time (e.g. 4-5 seconds) may be required for the first few layers in order to build a base. Consequently, the built objects and the build platform can be well bonded. For all other layers, as shown in FIG. 18, the building time of a layer ($T_{Layer}$) in our MIP-SL process may be only 1.4-2.5 seconds. The variation on $T_{Layer}$ may be mainly due to different layer thicknesses and the X moving distances. For an average of 2 seconds per layer and a layer thickness of 0.1 mm, the building speed of the developed MIP-SL process may be ~3 mm per minute, or 180 mm per hour.

Conclusions

A mask-image-projection-based stereolithography process has been presented for fabricating objects with digital materials. The proposed approach is based on projecting mask images bottom-up. Hence, a very shallow vat can be used in the building process. A two-channel system design has been presented, which can significantly reduce the separation force between a cured layer and the resin vat. A two-stage cleaning strategy has been developed to avoid contamination during the changed resin vats. The fabrication results demonstrate that the developed dual-material MIP-SL system can successfully produce 3D objects with spatial control over placement of both material and structure. The approach is general and can be easily extended from dual materials to multiple materials.

In addition, a mask-image-projection-based stereolithography process has been presented for fabricating 3D objects with fast building speed. The proposed approach is based on projecting mask images bottom-up on a PDMS coated glass substrate. A new two-way movement design has been presented for quickly spreading liquid resin into uniform thin layers. Such a design can significantly reduce the separation force between cured layers and the resin tank. Experimental results verified that the separation force as well as the sliding force can be relatively small during the two-way movement process. The motions related to the two-way movement design can also be performed quickly. The MIP-SL process developed based on such a recoating approach can achieve high fabrication speed for input CAD models. The experimental results demonstrate that the newly developed MIP-SL process can successfully fabricate 3D objects with satisfactory quality in a short time (usually in minutes).

The concept of digital materials as demonstrated by the polyjet process is interesting and significant. The work illustrates that such a concept can also be achieved by other additive manufacturing processes, thereby allowing more material choices. Combining multiple materials with various concentrations and structures to achieve desired characteristics such as multiple mechanical, electrical, chemical, biological, and optical properties can have numerous future applications.

The components, steps, features, objects, benefits, and advantages that have been discussed are merely illustrative. None of them, nor the discussions relating to them, are intended to limit the scope of protection in any way. Numerous other embodiments are also contemplated. These include embodiments that have fewer, additional, and/or different components, steps, features, objects, benefits, and advantages. These also include embodiments in which the components and/or steps are arranged and/or ordered differently.

For example, in addition to a rotation table and a linear stage as demonstrated (see FIGS. 11 and 18, respectively), there may be other motion designs that can be used to apply shearing force to detach a cured layer. A coating on the bottom of a vat may be critical in reducing the shearing force. A PDMS film was demonstrated. There are other types of coatings that may be used, e.g. Teflon film, or other silicon type materials. In addition, the mask image projection that has been discussed uses a micromirror device. However, other ways of defining mask images may be used in addition or instead, such as using a liquid-crystal display and/or a modulated laser.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

All articles, patents, patent applications, and other publications that have been cited in this disclosure are incorporated herein by reference.

The phrase "means for" when used in a claim is intended to and should be interpreted to embrace the corresponding structures and materials that have been described and their equivalents. Similarly, the phrase "step for" when used in a claim is intended to and should be interpreted to embrace the corresponding acts that have been described and their equivalents. The absence of these phrases from a claim means that the claim is not intended to and should not be interpreted to be limited to these corresponding structures, materials, or acts, or to their equivalents.

The scope of protection is limited solely by the claims that now follow. That scope is intended and should be interpreted to be as broad as is consistent with the ordinary meaning of the language that is used in the claims when interpreted in light of this specification and the prosecution history that follows, except where specific meanings have been set forth, and to encompass all structural and functional equivalents.

Relational terms such as "first" and "second" and the like may be used solely to distinguish one entity or action from another, without necessarily requiring or implying any actual relationship or order between them. The terms "comprises," "comprising," and any other variation thereof when used in connection with a list of elements in the specification or claims are intended to indicate that the list is not exclusive and that other elements may be included. Similarly, an element preceded by an "a" or an "an" does not, without further constraints, preclude the existence of additional elements of the identical type.

None of the claims are intended to embrace subject matter that fails to satisfy the requirement of Sections 101, 102, or 103 of the Patent Act, nor should they be interpreted in such a way. Any unintended coverage of such subject matter is hereby disclaimed. Except as just stated in this paragraph, nothing that has been stated or illustrated is intended or should be interpreted to cause a dedication of any component, step, feature, object, benefit, advantage, or equivalent to the public, regardless of whether it is or is not recited in the claims.

The abstract is provided to help the reader quickly ascertain the nature of the technical disclosure. It is submitted with the understanding that it will not be used to interpret or limit the scope or meaning of the claims. In addition, various features in the foregoing detailed description are grouped together in various embodiments to streamline the disclosure. This method of disclosure should not be interpreted as requiring claimed embodiments to require more features than are expressly recited in each claim. Rather, as the following claims reflect, inventive subject matter lies in less than all features of a single disclosed embodiment. Thus, the following claims are hereby incorporated into the detailed description, with each claim standing on its own as separately claimed subject matter.

The invention claimed is:

1. A system for producing a three-dimensional object in cascaded layers from a liquid resin that solidifies upon exposure to light, the system comprising:
   a vat that has a configuration that holds the liquid resin, the vat having a transparent bottom that allows light to pass through the transparent bottom and into the liquid resin;
   a mask image projection system that projects a controllable two-dimensional image through the transparent bottom of the vat and into the liquid resin that causes a portion of the liquid resin to solidify in the shape of the two-dimensional image;
a translation stage; and
a process controller that has a configuration that, during use of the system:
  causes the translation stage to be in a position relative to the vat that is suitable for solidifying the highest layer of the three-dimensional object that has not yet been solidified directly beneath any existing layers of the three-dimensional object that have been solidified;
  causes the mask image projection system to project a two-dimensional image of the highest un-solidified layer of the three-dimensional object through the transparent bottom of the vat and onto the liquid resin, thereby causing a portion of the liquid resin to solidify in the shape of the two-dimensional image and to adhere to the bottom of a surface beneath the solidified layer and to the bottom of the last layer that was previously solidified or, if none, to the bottom of the translation stage;
  causes a shearing force to be applied between the bottom surface of the solidified layer and the surface beneath that is great enough to detach the solidified layer from the surface beneath it; and
  causes the foregoing sequence of steps to be repeated until all of the cascaded layers of the three-dimensional object are solidified.

2. The system for producing a three-dimensional object in cascaded layers of claim 1 wherein the process controller has a configuration that causes the shearing force to be applied between the bottom surface of the solidified layer and the surface beneath that is great enough to detach the solidified layer from the surface beneath by causing relative horizontal, longitudinal movement between the translation stage and the vat.

3. The system for producing a three-dimensional object in cascaded layers of claim 2 wherein the process controller has a configuration that causes:
  before one instance of the relative movement, the translation stage to be in a first horizontal position with respect to the vat;
  after the one instance of the relative movement, the translation stage to be in a second horizontal position with respect to the vat that is substantially different than the horizontal first position; and
  while in both the first and the second horizontal positions, the mask image projection system to project a two-dimensional image of the highest un-solidified layer of the three-dimensional object through the transparent bottom of the vat and into the liquid resin, thereby causing a portion of the liquid resin to solidify in the shape of the two-dimensional image.

4. The system for producing a three-dimensional object in cascaded layers of claim 3 wherein the process controller has a configuration that causes the horizontal location of the image that is projected by the mask image projection system with respect to the horizontal location of the translation stage before the one instance of the relative movement and after the one instance of the relative movement to be the same.

5. The system for producing a three-dimensional object in cascaded layers of claim 1 wherein the process controller has a configuration that causes the shearing force to be applied between the bottom surface of the solidified layer and the surface beneath that is great enough to detach the solidified layer from the surface beneath by causing the relative movement between the translation stage and the vat that applies the shearing force to be rotational movement.

6. The system for producing a three-dimensional object in cascaded layers of claim 1 further comprising a solid, transparent coating between the top of the transparent bottom of the vat and the liquid resin.

7. The system for producing a three-dimensional object in cascaded layers of claim 6 wherein the solid, transparent coating is a PDMS film.

8. The system for producing a three-dimensional object in cascaded layers of claim 7 wherein the PDMS film is coated on at least a portion of the top of the transparent bottom of the vat.

9. The system for producing a three-dimensional object in cascaded layers of claim 6 wherein the solid, transparent coating has a thickness of between 0.1 and 5 mm.

10. The system for producing a three-dimensional object in cascaded layers of claim 6 wherein the solid, transparent coating has a thickness of between 0.25 and 3 mm.

11. The system for producing a three-dimensional object in cascaded layers of claim 6 wherein the solid, transparent coating has a thickness of between 0.5 and 1.5 mm.

12. The system for producing a three-dimensional object in cascaded layers of claim 6 wherein:
  the three-dimensional object has a maximum horizontal object width along its height;
  the interior of the vat has a horizontal vat width that is at least twice the maximum horizontal object width; and
  the transparent coating has a horizontal coating width that is no more than the horizontal vat width, less the maximum horizontal object width.

13. The system for producing a three-dimensional object in cascaded layers of claim 12 wherein the process controller has a configuration that causes the shearing force to be applied between the bottom surface of the solidified layer and the surface beneath that is great enough to detach the solidified layer from the surface beneath by causing the relative movement between the translation stage and the vat that applies the shearing force to be horizontal, longitudinal movement, and by causing the horizontal, longitudinal movement to traverse a length that is at least the maximum horizontal object width.

14. The system for producing a three-dimensional object in cascaded layers of claim 1 wherein:
  the translation stage controllable moves to different locations within the vat; and
  the process controller is configured to cause the relative movement between the translation stage and the vat by causing the translation stage to move.

15. The system for producing a three-dimensional object in cascaded layers of claim 1 wherein the process controller is configured to controllably move the translation stage.

16. The system for producing a three-dimensional object in cascaded layers of claim 1 wherein the process controller is configured to controllably move the vat.

17. A system for producing a three-dimensional object in cascaded layers from a first and a different second liquid resin that each solidify upon exposure to light, the system comprising:
  a first vat that has a configuration that holds the first liquid resin, the first vat including a first transparent bottom that allows light to pass through the first transparent bottom and into the first liquid resin;
  a second vat that is different than the first vat and that has a configuration that holds the second liquid resin, the second vat including a second transparent bottom that allows light to pass through the second transparent bottom and into the second liquid resin;

a mask image projection system that projects a controllable two-dimensional image:
- through the bottom of the first vat and into the first liquid resin that causes at least a portion of the first liquid resin to solidify in the shape of the two-dimensional image; and, at a different time,
- through the bottom of the second vat and into the second liquid resin that causes at least a portion of the second liquid resin to solidify in the shape of the two-dimensional image;

a translation stage; and a process controller that has a configuration that, during use of the system:
- causes the translation stage to be in a position relative to the first vat that is suitable for solidifying the highest un-solidified layer of the three-dimensional object that has not yet been solidified directly beneath any existing layers of the three-dimensional object that have been solidified;
- causes the mask image projection system to project a two-dimensional image of an un-solidified layer of the three-dimensional object through the bottom of the first vat and into the first liquid resin, thereby causing at least a portion of the first liquid resin to solidify in the shape of the two-dimensional image and to adhere to the bottom of a surface beneath the solidified layer and to the bottom of the last layer that was previously solidified or, if none, to the bottom of the translation stage;
- applies a shearing force between the bottom surface of the solidified layer and the surface beneath that is great enough to detach the first solidified layer from the surface beneath it;
- causes the translation stage to be in a position relative to the second vat that is suitable for solidifying the highest un-solidified layer of the three-dimensional object that has not yet been solidified directly beneath any existing layers of the three-dimensional object that have been solidified;
- causes the mask image projection system to project another two-dimensional image of the highest un-solidified layer of the three-dimensional object through the bottom of the second vat and into the second liquid resin, thereby causing at least a portion of the second liquid resin to solidify in the shape of the other two-dimensional image and to adhere to the bottom of a surface beneath the solidified layer and to the bottom of the last layer that was previously solidified or, if none, to the bottom of the translation stage; and
- causes the foregoing sequence of steps to be repeated in connection with the first and/or second vat until all of the cascaded layers of the three-dimensional object are solidified.

18. The system of claim 17 further comprising a rotating table containing the first and the second vats and that, during the sequence of steps, rotates them under the control of the process controller relative to the translation stage and the mask imaging system.

19. The system of claim 18 further comprising a first and a second brush on the rotating table and wherein the process controller has a configuration that causes:

- the bottom of any cascaded layers to be brushed by the first brush but not the second brush before causing the translation stage to be in the position relative to the first vat; and
- the bottom of any cascaded layers to be brushed by the second brush but not the first brush before causing the translation stage to be in the position relative to the second vat.

* * * * *